United States Patent [19]
Shimomura et al.

[11] Patent Number: 5,848,238
[45] Date of Patent: Dec. 8, 1998

[54] INFORMATION PROCESSING SYSTEM AND LOGIC LSI, DETECTING A FAULT IN THE SYSTEM OR THE LSI, BY USING INTERNAL DATA PROCESSED IN EACH OF THEM

[75] Inventors: Tetsuya Shimomura, Hitachi; Fumio Murabayashi, Urizura-machi; Kotaro Shimamura, Hitachi; Nobuyasu Kanekawa, Hitachi; Takashi Hotta, Hitachi, all of Japan

[73] Assignee: Hitachi, Ltd., Tokyo, Japan

[21] Appl. No.: 778,685

[22] Filed: Jan. 3, 1997

[30] Foreign Application Priority Data

Jan. 12, 1996 [JP] Japan .................................. 8-004127

[51] Int. Cl.[6] .................................................. G06F 11/18
[52] U.S. Cl. .............................. 395/185.02; 395/182.08
[58] Field of Search ........................ 395/182.08, 182.09, 395/183.03, 183.04, 183.06, 183.07, 183.13, 184.01, 185.01, 185.02

[56] References Cited

U.S. PATENT DOCUMENTS

| | | | |
|---|---|---|---|
| 4,456,952 | 6/1984 | Mohrman et al. | 395/182.09 |
| 5,005,174 | 4/1991 | Bruckert et al. | 395/182.09 |
| 5,202,980 | 4/1993 | Morita et al. | 395/182.09 |
| 5,428,768 | 6/1995 | Sugahara | 395/182.08 |
| 5,452,443 | 9/1995 | Oyamada et al. | 395/182.08 |
| 5,577,199 | 11/1996 | Tanabe et al. | 395/183.13 |
| 5,636,341 | 6/1997 | Matsushita et al. | 395/182.11 |

FOREIGN PATENT DOCUMENTS 7-129426  10/1995  Japan .

OTHER PUBLICATIONS

"Fault Tolerance Achieved in VLSI", R. Emerson et al., IEEE Mirco., Dec. 1984, pp. 34–43.

*Primary Examiner*—Ly Hua
*Attorney, Agent, or Firm*—Antonelli, Terry, Stout & Kraus, LLP

[57] ABSTRACT

An information processing system has a plurality of processor circuits, each of the processor circuits including internal circuits and an internal processing result outputting circuit, the system having an internal data selection circuit connected to each of the processor circuits and at least one fault detection circuit. The internal processing result outputting circuit of each of the processor circuits outputs respective result data processed by respective ones of the internal circuits in the processor circuit. Each of the internal data selection circuit selects and outputs one selected result data output from the internal processing result outputting circuit of each of the processor circuits, at a predetermined timing. The fault detection circuit outputs a result of a comparison among the data selected by the respective internal data selection circuits of the processor circuits or among the data output at each predetermined timing by the processor circuits.

18 Claims, 12 Drawing Sheets

INSTR : INSTRUCTION

INFORMATION PROCESSING SYSTEM AND LOGIC LSI, DETECTING A FAULT IN THE SYSTEM OR THE LSI, BY USING INTERNAL DATA PROCESSED IN EACH OF THEM

BACKGROUND OF THE INVENTION

1. Field of the Invention:

The present invention relates to an information processing system and a logic LSI to which a master/checker method is applied, with the objective of improving the fault detection efficiency.

2. Description of Related Art:

An information processing apparatus to which a master/checker method is applied, with the objective of improving the fault detection efficiency, already has been presented. For example, an information processing apparatus having the above-mentioned feature is disclosed in "Fault Tolerance Achieved in VLSI", by R. Emmerson et al., IEEE Micro., December 1984, pp 34–43.

In the above-mentioned apparatus, data output from a master unit is input to a checker unit via a data bus. The output data of the master unit input to the checker unit is compared with corresponding output data of the checker unit by a comparator provided in the checker unit If a result of the comparison indicates a disagreement between both data, the comparator outputs a fault detecting signal, and the operation of the information processing apparatus is stopped.

On the other hand, due to recent rapid innovation in LSI processing techniques, a processor including many peripheral circuits, such as cache memory, has been developed. Therefore, it has been considered not sufficient for fault detection in an apparatus containing a plurality of processors, such as mentioned above, to be carried out merely by comparing a pair of data transmitted to a data bus.

As a method of improving the fault detection efficiency, it also has been proposed to execute a comparison between data output from one of the peripheral circuits integrated in a processor provided in a master unit and data output from a corresponding one of the peripheral circuits integrated in a processor provided with a checker, in addition to the comparison between data output on the data bus. However, if the fault detection is carried out for output data of all integrated circuits in a master unit and a checker, a new problem is caused, that is, a comparator for comparing data processed in the integrated circuits and the wiring among the integrated circuits and the comparators need a large area, respectively.

As a method of resolving the above-mentioned problem, "A fault detection processing method" is disclosed in JP-A-129426/1985 by Hujiwara et al.. In this method, the fault detection is realized by executing a comparison between a result of an exclusive OR calculation for data output from the integrated circuits of a processor in a master unit and a result of an exclusive OR calculation for data output from the integrated circuits of a processor in a checker. Although this method avoids the need to increase the area needed for a comparator and the wiring , faults of 2 bits cannot be detected. Therefore, by this method, a sufficient fault detection efficiency can not be attained.

SUMMARY OF THE INVENTION

An objective of the present invention is to provide an information processing system and a logic LSI to which a master/checker method is applied, with the result of improving the fault detection efficiency, while suppressing the need to increase the amount of wiring (between pins of two LSIs in a system wherein a master unit and a checker are composed by using two different LSIs, or between a master unit and a checker in a system wherein a master unit and a checker are integrated in one LSI), and to increase the area needed for a comparator executing the comparison between a pair of corresponding data output from the master unit and the checker.

The first way to attain the above-mentioned objective is to provide an information processing system, including a plurality of information processing units, in which a fault occurring in the plurality of information processing units is detected by carrying out a comparison among data, each of the data being processed and output by each of the plurality of information processing units, wherein each of the plurality of information processing units includes a processor circuit in which a plurality of internal circuits is integrated, an internal processing result outputting means for outputting respective result data processed by respective ones of the plurality of internal circuits, and an internal data selection circuit for selecting and outputting a selected one of the result data output from the internal processing result outputting means, at every predetermined timing, and the information processing system further includes a comparator for executing a comparison among corresponding data, each of which is selected and output from the internal data selection circuit of each information processing unit, and for outputting a result of the comparison.

In this information processing system, it is preferable that buses are used for connection between the information processing units, and between the comparator and each of the information processing units, and at least one of the information processing units inputs data output from the internal data selection circuit provided in the unit itself to the comparator via the buses.

Further, in this information processing system, it is possible for the at least one of the information processing units, inputting data output from the internal data selection circuit provided in the unit to the comparator via the buses, to further include a first selector for selecting either the result data output from the processor circuit provided in the unit or data output from the internal data selection circuit provided in the unit.

The information processing system according to the present invention further includes a memory device, and data which is output from the above-mentioned processor unit to the memory device via the buses is also input to the comparator and compared with data which is output from the processor circuits of other information processing units and input to the comparator.

Further, in this information processing system, it is possible to include the comparator in one of the information processing units, and the information processing unit including the comparator further is provided with a second selector for selecting and outputting either data output from the processor circuit provided in the unit or data output from the internal data selection circuit provided in the unit, in synchronism with data selection by the first selector included in another information processing unit.

In the following, an example of operations of the information processing system according to the present invention will be explained.

The internal processing result outputting means of each processor circuit outputs result data processed by each of the internal circuits. The internal data selection circuit selects and outputs one of the result data output from the internal processing result data outputting means, at every predetermined timing (for example, an execution machine cycle of the processor circuit). The comparator executes a comparison between the data input from the internal data selection circuits provided in two of the information processing units, and outputs a result of the comparison. By monitoring the result of the comparison, it is possible to detect a fault occurring in the information processing system. That is, if the two compared data do not agree with each other, it means that some fault is occurring in the information processing system.

If the data output from the internal data selection circuit of each information processing unit is input to the comparator via the above-mentioned buses, it is not necessary to provide exclusive wires for inputting and outputting the data input to the comparator. Further, by selecting and outputting either the data output from the processor circuit or the data output from the internal data selection circuit to the buses, via the first selector, wires and terminals connected to the buses can be commonly used.

Moreover, if the comparison is carried out for data output from the processor circuit to the memory device by using the comparator, a fault occurrence can be also detected, based on the agreement between the corresponding data output from both processor circuits. In the case of providing the comparator in one of the information processing units, the second selector is controlled so as to select either the data output from the processor circuit or the data output from the internal signal selection circuit, in synchronism with the data selection of the first selector. Contents of a pair of data to be compared by the comparator are changed corresponding to the selection state of the first and second selectors (namely, the comparison between data output to the memory device from the processor circuit of the master unit and data output from the processor circuit of the checker unit including the comparator or the comparison between data output from the respective internal data selection circuits provided in the master unit and the checker unit).

A second way to attain the above-mentioned objective is to provide an information processing system including a plurality of information processing units, which detects a fault occurring in the plurality of information processing units by carrying out a comparison among data, each of the data being processed and output by each of the plurality of information processing units, the information processing system comprising a data transmission path for bidirectionally transmitting data among the information processing units, wherein each of the plurality of information processing units includes a processor circuit in which a plurality of internal circuits are integrated, an internal processing results outputting means for outputting result data, processed by each of the plurality of internal circuits, to other information processing unit via the data transmission path, an internal data selection circuit for selecting and outputting one of the result data output from the internal processing results outputting means, at every predetermined timing, an internal data outputting means for outputting a part of the data output from the internal data selection circuit, and a comparator for executing a comparison between the part of the result data output from the internal data outputting means, which is output from the internal data selection circuit of the information processing unit, and a part of result data, corresponding to the part of the result data output from the internal data outputting means of another information processing unit, and outputting a result of the comparison.

Further, it is possible for each of the information processing units to include a simultaneous bidirectional interface for simultaneously inputting and outputting data via the data transmission path.

In the following, operations of the information processing system according to the present invention will be explained.

The internal processing result outputting means of each processor circuit outputs result data processed in each integrated circuit of the processor circuit. The internal data selection circuit selects and outputs one of the result data output by the internal processing result outputting means, at every predetermined timing (for example, the execution machine cycle of the processor circuit). The internal data outputting means outputs a part of the result data output from the internal data selection circuit via the data transmission path.

The comparator compares the part of the result data output from the internal data outputting means, which is output from the internal data selection circuit of the information processing unit, and a part of result data corresponding to the part of the result data output from the internal data selection circuit of another information processing unit via the data transmission path, and outputs a result of the comparison. By monitoring the result of the comparison, it is possible to detect a fault occurring in the information processing system. That is, if the two compared data do not agree with each other, it means that some fault is occurring in the information processing system. In this way, the plurality of information processing units share the fault detection. Therefore, if the disagreement in the comparison between a pair of the corresponding parts of the result data is detected by any of the information processing units, it is determined that some fault is occurring in the information processing system.

In this case, if inputting and outputting of the data output from the internal data outputting means are carried out by using a simultaneous bidirectional interface provided in each information processing unit, the number of pins for wiring among the units can be reduced. For example, if the internal data (the result data) selected by each internal data selection circuit is mutually transmitted between the units by a half of a data width of the internal data, the number of the pins can be reduced to ½ of the number necessary for transmitting the data of a full width.

For the above-mentioned first and second aspects of the present invention, it is preferable that the internal data selection circuit further outputs selection information for indicating which of the data output from the internal processing result outputting means has been selected, and the comparator outputs a result of the data comparison together with the selection information.

Moreover, it is possible for the information processing system to carry out recovery processing (a counter-measure) in response to the detected fault, corresponding to the contents of the result of the data comparison and the output selection information.

By carrying out the recovery processing, an optimal counter-measure can be performed for the system in which the fault is occurring, corresponding to the location of the fault occurrence.

A third way to attain the objective of the invention is to provide an information processing system including a plurality of processing nodes, wherein information processing is continued by switching from one processing node which is performing information processing when a fault is detected to another processing node, corresponding to the processing states of the information processing system, wherein each processing node includes a fault detection means for monitoring the state of processing of the node itself and for outputting information of a fault occurrence and a fault occurrence location if a fault is detected in the node, and the information processing system includes a switching means for switching from the processing node which is executing information processing to another processing node, after performing the predetermined counter-measure processing to the fault occurrence location.

Each of the processing nodes comprises a plurality of processor circuits, each of the processor circuits including a plurality of integrated internal circuits and an internal processing result outputting means for outputting result data processed by each of the internal circuits, and an internal data selection circuit which is connected to each of the processor circuits, for selecting and outputting one of the result data output from the internal processing result outputting means at every predetermined timing, wherein the fault detection means executes a comparison among the result data selected by the respective internal data selection circuits provided in the node, and outputs a result of the comparison together with the selection information for indicating which of data output from the internal processing result outputting means has been selected.

In the following, operations of this information processing system according to the present invention will be explained.

The fault detection means of the processing node monitors the states of the processing stages executed in the node itself, and outputs information of a fault occurrence and a fault occurrence location if a fault is detected in the node.

The above-mentioned fault detection is realized, for example, as follows. The internal processing result outputting means of each of the processor circuits provided in the processing node outputs the result data processed by each of the internal circuits provided in the processor circuit. Each of the internal data selection means basically selects and outputs different result data output from the internal processing result outputting means, at every predetermined timing. The fault detection means outputs a result of the comparison among the data selected by the internal data selection means in the node, as well as the selection information from each of the internal data selection means, the selection information indicating which of data output from the internal processing result outputting means has been selected.

The switching means of the information processing system switches from one processing node which is to execute the information processing to another processing node, after performing the predetermined counter-measure processing to the fault occurrence location.

In the above-mentioned first, second and third aspects of the invention, it is possible for each of the processor circuits to include a processing state outputting means for outputting states of processing executed in each of the internal circuits of the processor circuit, and the internal data selection circuit connected to the processor circuit changes data to be selected, corresponding to contents of the states of processing output from the processing state outputting means.

The processing state outputting means outputs states of processing executed in each internal circuit (for example, a state as to whether a cache memory integrated in each processor circuit is used or not). The internal data selection circuit changes data to be selected, for example, the internal data selection circuit removes data stored in the cache memory from candidates to be selected, if it is judged, by checking contents of data output from the processing state outputting means, that the cache memory is not to be used. By providing the processing state outputting means, since data processed in an internal circuit which does not execute significant processing is removed from the candidates to be selected by the internal data selection circuit and compared in the fault detection means, the fault detection can be more efficiently performed.

The fourth way to attain the objective of the present invention to provide a logic LSI comprises a processor circuit including a plurality of integrated internal circuits and an internal processing result outputting means for outputting result data processed by the internal circuits, and an internal data selection circuit for selecting and outputting one of the result data output from the internal processing result outputting means to the outside of the logic LSI, at every predetermined timing.

It is preferable that the above-mentioned logic LSI further includes a comparator for comparing the data output from the internal data selection circuit with data input from the outside of the logic LSI.

Further, it is possible for the logic LSI to include a simultaneous bidirectional interface for simultaneously inputting and outputting data by using a common signal wire, a part of the data output from the internal data selection circuit being output to the outside via the simultaneous bidirectional interface, and the data input from the outside is input via the simultaneous bidirectional interface.

It is preferable that the processor circuit further includes a processing state outputting means for outputting states of processing executed in each of the internal circuits of the processor circuit, and the internal data selection circuit connected to the processor circuit changes data to be selected, corresponding to the processing states output from the processing state outputting means.

In the following, operations of the logic LSI according to the present invention will be explained.

The internal processing result outputting means of the processor circuit outputs result data processed by each of the internal circuits. The internal data selection circuit selects and outputs one of the result data output from the internal processing result outputting means to the outside of the logic LSI, at every predetermined timing.

If a simultaneous bidirectional interface is used so that a part of the data output from the internal data selection circuit is output to the outside, and the data input from the outside (actual data output from the internal data selection circuit of other LSI) is received, the number of signal wires can be reduced.

In the logic LSI further including a comparator, the comparator compares the data output from the internal data selection circuit with the data input from the outside, and outputs a result of the comparison.

Moreover, in the logic LSI including a processing state outputting means, the processing state outputting means outputs processing states of each of the internal circuits (for example, a state as to whether a cache memory integrated in each processor circuit is used or not). The internal data selection circuit changes data to be selected, for example, the circuit removes data stored in the cache memory from candidates to be selected, if it is judged, by checking the contents of data output from the processing state outputting means, that the cache memory is not to be used. By providing the processing state outputting means, since data processed by an internal circuit which is not executing significant processing is removed from candidates to be selected by the internal data selection circuit and to be compared in the fault detection means, the fault detection can be more efficiently performed.

BRIEF DESCRIPTION OF THE DRAWINGS

FIG. 2 is a block diagram of an example of the processor circuit 101a.

FIG. 3 is a block diagram of an example of the internal data selection circuit 150a.

FIG. 12 is a block diagram of an example of the internal data selection circuit 15150a.

DETAILED DESCRIPTION OF THE EMBODIMENTS

Figure 1:
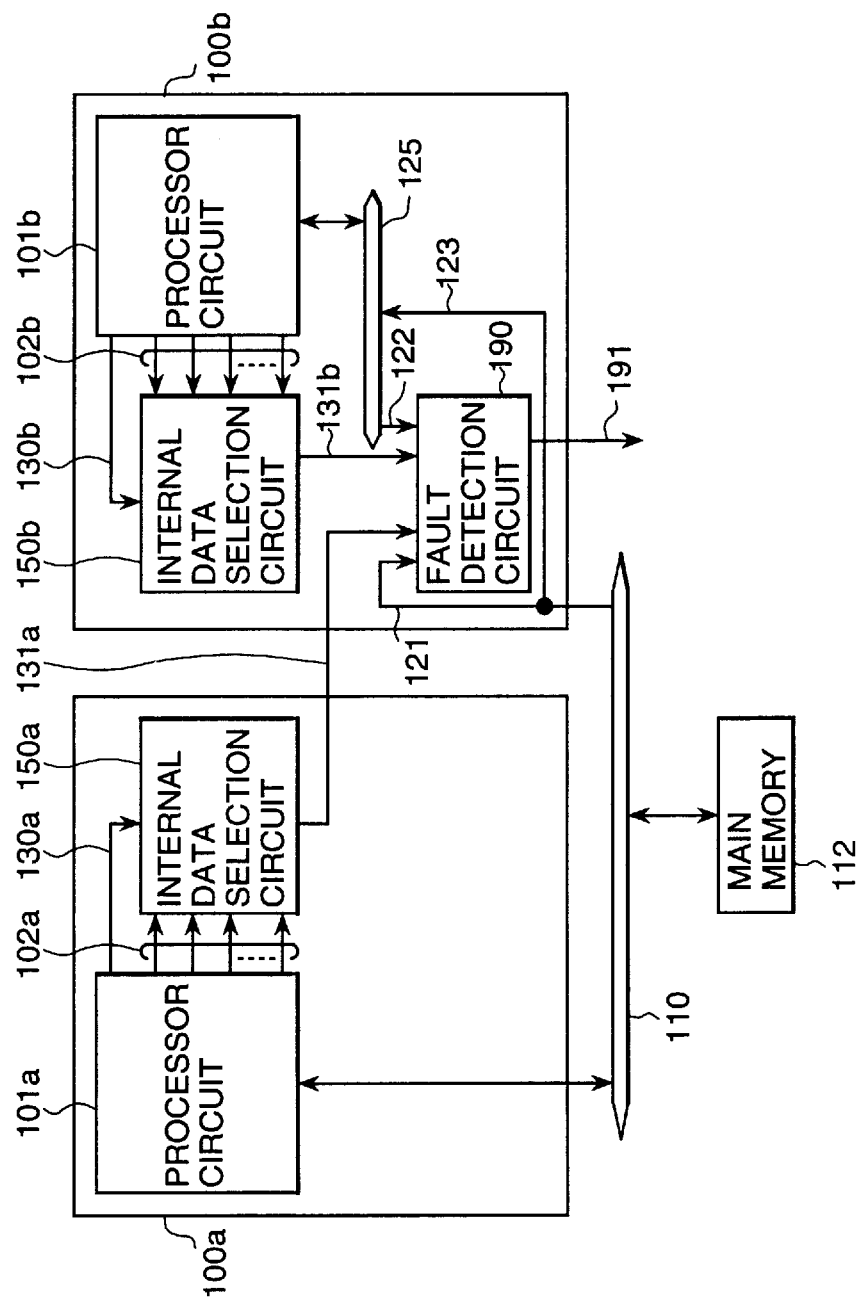
FIG. 1 is a block diagram of an information processing system according to the present invention.

Hereinafter, details of the present invention will be explained with reference to various embodiments shown in the drawings.

FIG. 1 shows the composition of an information processing system forming a first embodiment according to the present invention. In this embodiment, the information processing system includes a master unit 100a, a checker unit 100b, processor circuits 101a and 101b, internal data selection circuits 150a and 150b, a fault detection circuit 190, a common bus 110, a main memory 112, transmission paths 121–123, and an internal bus 125. Further, numeral 191 indicates a fault detecting signal, numerals 102a and 102b indicate internal processing result data, numerals 130a and 130b indicate data selection signals, and numerals 131a and 131b indicate internal data.

It is possible for each of the master unit 100a and the checker unit 100b to be composed of a respective LSI, or both the master unit 10a and the checker unit 100b may be integrated in one LSI. Moreover, the master unit 100a, the checker unit 100b and the common bus 110 can be also compactly formed in one LSI.

The master unit 100a and the checker unit 100b execute the same data processing. For reading data out of the main memory 112, the processor circuit 101a in the master unit 100a sends an address of the data to be read out to the main memory 112 via the common bus 110. Corresponding to the sent address, the main memory 112 sends the data stored at the address to the processor circuit 101a via the common bus 110. The checker unit 100b also takes in the data sent to the common bus 110, in synchronism with the timing at which the data is output to the common bus 110 from the main memory 112. This data is transmitted to the processor circuit 101b via the transmission path 123 and the internal bus 125.

For writing data in the main memory 112, the processor circuit 101a sends the data and an address of the data to the main memory 112 via the common bus 110. The checker unit 100b also takes in the data sent to the common bus 110, in synchronism with the timing at which the master unit 100b outputs the data and the address to the common bus 110. The data input to the checker unit 100b is input to the fault detection circuit 190 via the transmission path 121. Simultaneously, data output from the processor circuit 101b is also input to the fault detection circuit 190 via the internal bus 125 and the transmission path 122.

Further, the processor circuit 101a outputs result data processed by various internal circuits integrated in the processor circuit 101a itself as internal data to the internal data selection circuit 150a. Furthermore, the processor circuit 101a generates the data selection signal 130a, and outputs it to the internal data selection circuit 150a. Contents of the data selection signal change corresponding to the processing states of the processor circuit 101a at every predetermined timing, for example, according to the execution machine cycle. The internal data selection circuit 150a selects one of the internal processing data 102a, based on the data selection signal 130a, and outputs the selected data as internal data 131a to the checker unit 100b. As mentioned above, the kind of data to be output as the internal data 131a (that is, the kind of an internal circuit to be checked for a fault occurrence) is repeatedly checked at every execution machine cycle.

As in the master unit 100a, the internal data 131b is output from the internal data selection circuit 150b in the checker unit 100b. The internal data 131a output in the master unit 100a and the internal data 131b output in the checker unit 100b are input to the fault detection circuit 190.

The fault detection circuit 190 checks for an agreement between the result data processed in the master unit 100a and the checker unit 100b, by comparing the data input from the transmission path 121 with the data input from the transmission path 122, i.e. it compares the internal data 131a with the internal data 131b. If a disagreement between the result data processed in the master unit 100a and the checker unit 100b is detected by the fault detection circuit 190, it is determined that some fault is occurring in the information processing system, and a fault detecting signal 191 is output from the fault detection circuit 190.

As mentioned above, an internal circuit to be checked for a fault occurrence is selected on the basis of the data selection signals 130a and 130b, the contents of which are renewed according to the processing states of the processor circuits 101a and 101b at every execution machine cycle (naturally, the same contents possibly are repeated for some cycles). By providing and using the data selection signals 130a and 130b, it is possible to execute fault detection for only those internal circuits performing significant processing. Consequently, in the case of forming each of the master unit 100a and the checker unit 100b by using a respective LSI, the fault detection efficiency can be increased, while the number of wiring pins between the LSIs and the area of the fault detection circuit are reduced. On the other hand, in the case of integrating both the master unit 100a and the checker unit 100b into one LSI, the fault detection efficiency can be increased, while the number of wires for transmitting the internal data 131a to the fault detection circuit 190 and the area of the fault detection circuit are also reduced.

In the following, each part of the composition of the embodiment is explained in more detail.

An example of the processor circuit 101a shown in FIG. 1 will be explained by referring to FIG. 2.

The processor circuit 101a is composed of a core processor 200, an integrated RAM 201, an integrated ROM 202, an integrated cache memory 203, an I/O interface 205 with outer circuits, and internal buses 211–213.

The internal processing result data 102a-1–102a-5, are data read out of the internal bus 212, a register and a calculator in the core processor 200, and the internal buses 211 and 213.

For reading data out of the integrated RAM 201, the core processor 200 transmits an address of the data to be read out, to the integrated RAM 201 via the internal bus 211. Further, the integrated RAM 201 transmits data stored at the address to the core processor 200. The read out data and its address are output as the internal processing result data 102a-4.

Reading data out of the integrated ROM 202 is carried out via the internal bus 211 in the same manner as reading data out of the integrated RAM 201. The read out data and its address are also output as the internal processing result data 102a-4.

For reading data out of the integrated cache memory 203, the core processor 200 transmits an address of the data to be read out to the integrated cache memory 203 via the internal bus 212. Further, the integrated cache memory 203 transmits data stored at the address to the core processor 200. The readout data and its address are output as the result data 102a-1.

If the data corresponding to the address is not registered in the integrated cache memory 203, the address is transmitted to the I/O interface 205 via the internal buses 212 and 213. The I/O interface 205 executes the access to the main memory 112 to read out the data corresponding to the address. The data transmitted from the main memory 112 is registered into the integrated cache memory 203 via the internal buses 213 and 212, and also is transmitted to the core processor 200. When the data is transmitted to the internal bus 213, the data is output as the internal processing result data 102a-5.

If direct access using the I/O interface 205 is performed without access to the cache memory 203, the core processor 200 executes the access to the I/O interface 205 via the internal bus 213. The address output from the core processor 200 is also output as the internal processing result data 102a-5.

When calculation processing is executed by a calculator in the core processor 200, a result of the calculation is output as the internal processing result data 102a-3. Further, when data is written in a register of the core processor 200, the data to be written in the register is output as the internal processing result data 102a-2.

Figure 3:
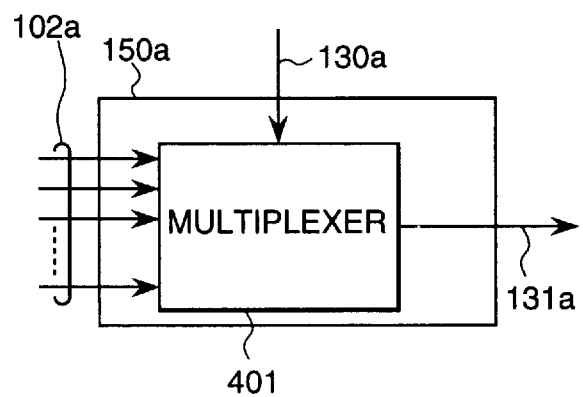

In the following, an example of the internal data selection circuit 150a shown in FIG. 1, will be explained by referring to FIG. 3.

The internal data selection circuit 150a in this example is mainly composed of a multiplexer 401. The multiplexer 401 selects one of the internal data 102a on the basis of the data selection signal 130a, and outputs the selected data as internal data 131a.

Figure 4:
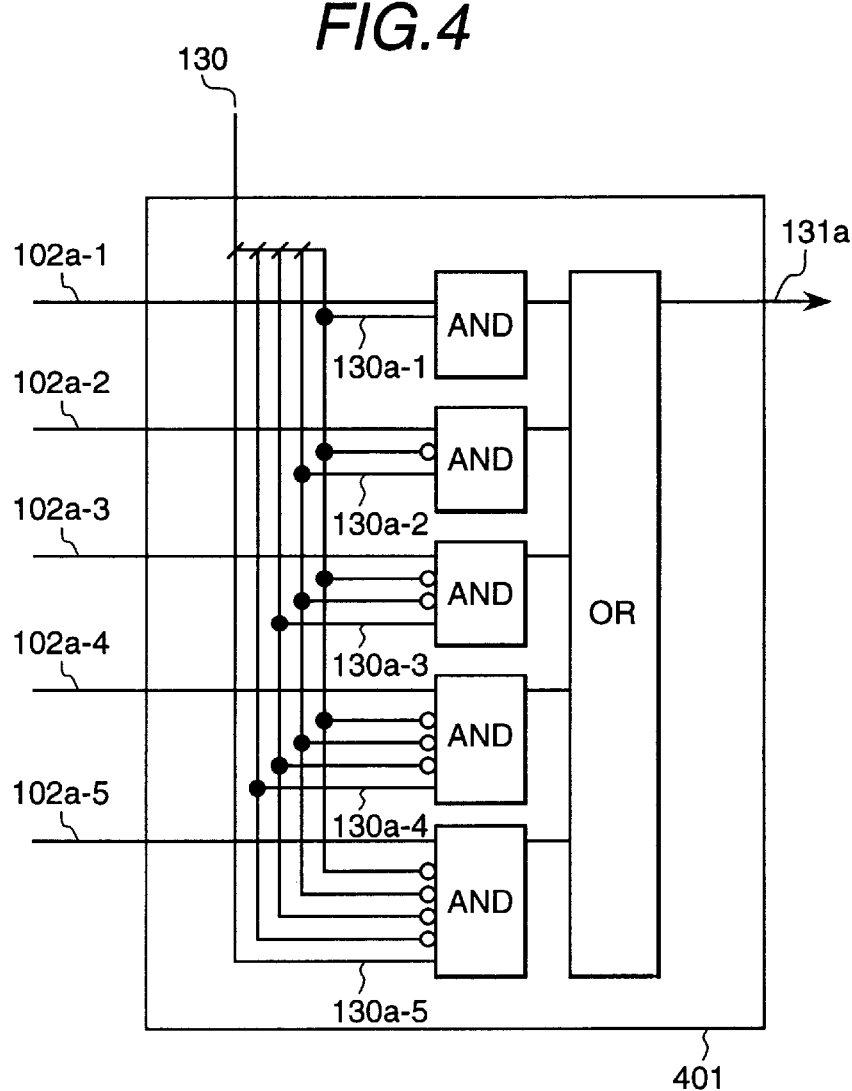
FIG. 4 is a block diagram of an example of the multiplexer 401.

In FIG. 4, an example of the multiplexer 401 is shown. In the figure, numerals 130a-1–130a-5 indicate the data selection signals. Further, numerals 102a-1–102a-5 indicate the internal processing result data. The multiplexer 401 is composed of five AND logic circuits and one OR logic circuit.

Since the internal processing result data 102 contains five kinds of data, the data selection signal 130a is provided as a 5 bit signal (130a-1–130a-5). Each bit of the data selection signal corresponds to each of the internal data 102a (102a-1–102a-5). A respective priority is set to each bit of the data selection signal 130a. As shown in FIG. 4, the bit possessing the highest priority is the bit 130a-1. If the bit 130a-1 is 1, the internal processing result data 102a-1 is output as the internal data 131a, independently of the values of the bits 130a-2–130a-5. If the bit 130a-1 is 0, and the bit 130a-3 is 1, the internal processing result data 102a-2 is output as the internal data 131a, independently of the values of the 130a-3–130a-5. If the bits 130a-1 and 130a-2 are 0, and the bit 130a-3 is 1, the internal processing result data 102a-3 is output as the internal data 131a, independently of the values of the bits 130a-4 and 130a-5. Further, if the bit signals 130a-1–130a-3 are 0, and the bits 130a-4 is 1, the internal processing result data 102a-4 is output as the internal data 131a, independently of the values of the bit 130a-5. Furthermore, if the bits 130a-1–130a-4 are 0, and the bit 130a-5 is 1, the internal processing result data 102a-5 is output as the internal data 131a.

Now, if all the internal processing result data 102a-1–102a-5 are data of 32 bits, the fault detection for all bit signals of the internal processing result data 102a-1–102a-5 usually requires 160 (=32 bits×5 internal circuits) wires for the internal data 131a. On the other hand, since only one of internal processing result data from the five internal circuits is output at every predetermined timing in the embodiment, only 32 wires have to be provided. Therefore, if an exclusive wiring path is provided for sending the internal data from the master unit 100aLSI to the checker unit 100b LSI as shown in FIG. 1, the number of LSI pins for wires transmitting the internal data 131a from the master unit 100a to the checker unit 100b can be reduced to ⅕ of that of an existing information processing system.

Figure 5:
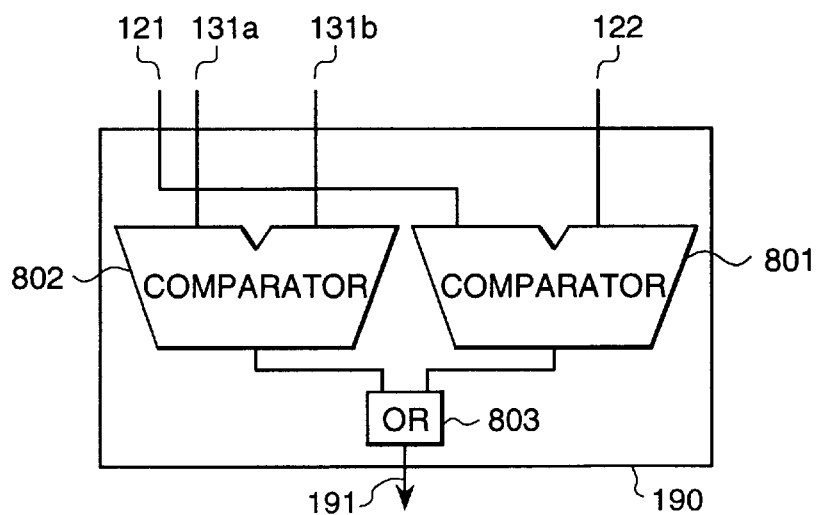
FIG. 5 is a block diagram of an example of the fault detection circuit 190.

An example of the fault detection circuit 190 in FIG. 1 is shown in FIG. 5. The fault detection circuit 190 is composed of two comparators 801 and 802, and an OR logic element 803. The comparator 801 compares the data input from the transmission path 121 with the data input from the transmission path 122, and the comparator 802 compares the internal data 131a with the internal data 131b.

Output signals (results of the comparisons) of the comparators 801 and 802 are input to the OR logic element 803. Further, the OR logic element outputs a fault detecting signal 191 if at least one of the comparators 801 and 802 detects disagreement between the input pair data to be compared with each other.

If the comparator 802 is composed of a 2 input EOR logic element and a 2 input OR logic element, n EOR logic elements and (n–1) OR logic elements are necessary to execute a comparison between two n bit data. If all the internal processing result data 102a-1–102a-5 shown are data of 32 bits, a comparison between two 160 bit data (=32 bits×5 internal circuits) has to be executed for detecting a fault to each of all bit signals of the internal processing result data 102a. In this case, 160 EOR logic elements and 259 OR logic elements are usually necessary for the comparator 802. On the other hand, since the comparison for the fault detection has only to be performed for one of the internal data from the five internal circuits at every predetermined timing in the embodiment, the comparison of only 32 bit signals has to be executed in the comparator 802. Therefore, only 32 EOR logic elements and 31 OR logic elements are necessary and sufficient. Thus, the area of the comparator 802 can be reduced to ⅕ of that of a comparator used in an existing information processing system.

In the following, changes in the internal data 131a will be explained by referring to the time chart shown in FIG. 6.

Figure 6:
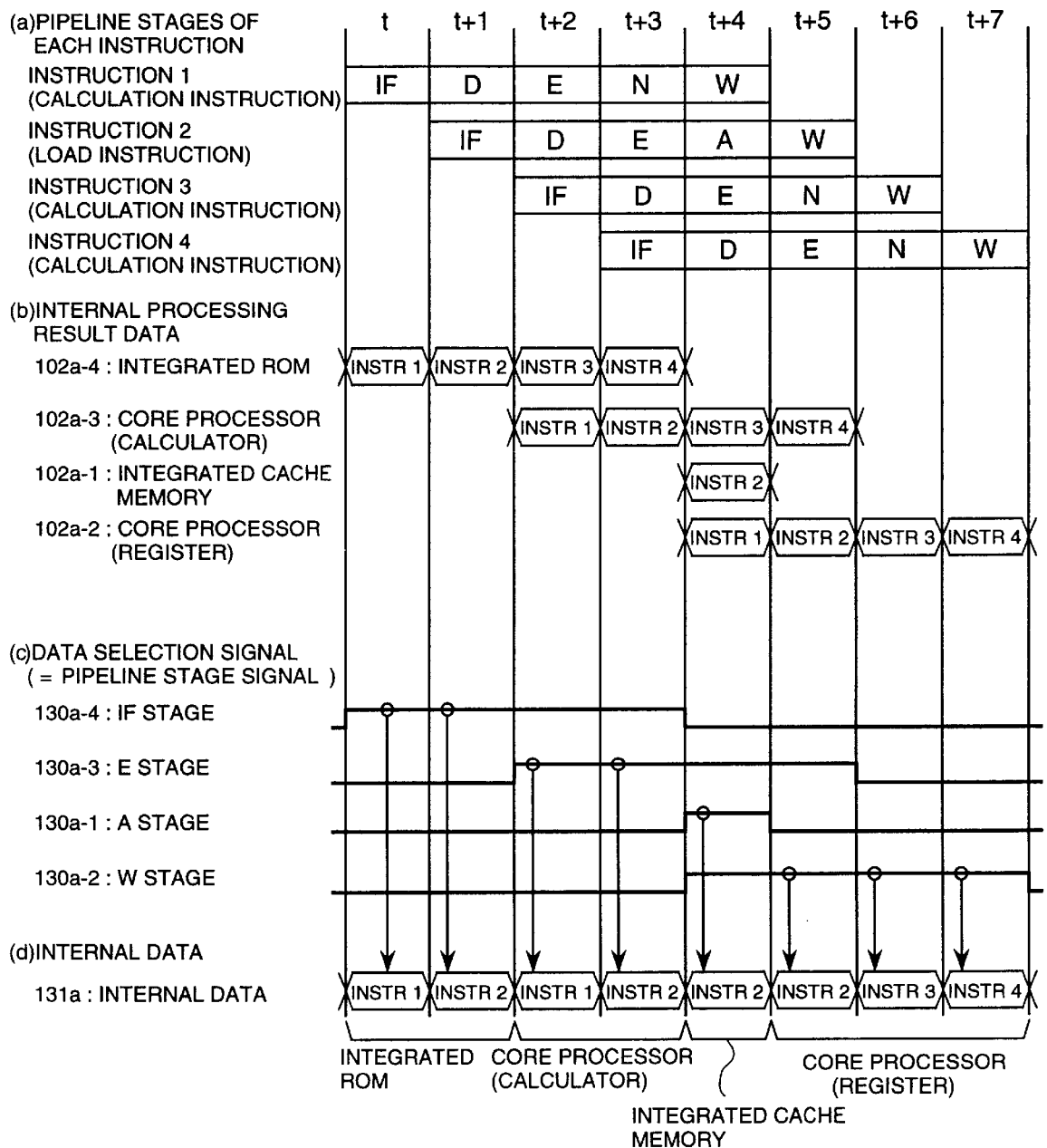
FIG. 6 is a time chart for explaining operations of the embodiment shown in FIG. 1.

FIG. 6 shows how the data output from the internal data selection circuit 150a shown in FIG. 1, (namely, the internal data 131a), changes while four instructions, from an instruction 1 (calculation instruction) to an instruction 4 (calculation instruction), are executed. In this explanation, it is assumed that the core processor 200 executes a pipeline processing, and instructions to be executed are stored in the integrated ROM 202. In part (a) of FIG. 6, pipeline processing stages for each instruction are shown. A pipeline for a load instruction (the instruction 2) is composed of an instruction fetch stage (referred to as an IF stage), an instruction decoding stage (referred to as a D stage), an instruction executing stage (referred to as an E stage), a memory access stage (referred to as an A stage), and a data writing-in-register stage (referred to as a W stage).

Pipelines of other instructions (calculation instructions 1, 3 and 4) have the same composition as the composition of the load instruction 2, other than the A stage. In these pipelines, an N stage, in which no significant processing is executed, is provided in the place of the A stage in the load instruction 2. That is, the N stage is provided to adjust the position of the W stage in the calculation instruction to the position of the W stage in the load instruction, and does not use any one of the circuits which make up the information processing system.

In part (b) of FIG. 6, it is shown how the internal processing result data 102a output from the processor circuit 101a of FIG. 1 changes during the execution of four instructions.

Figure 2:
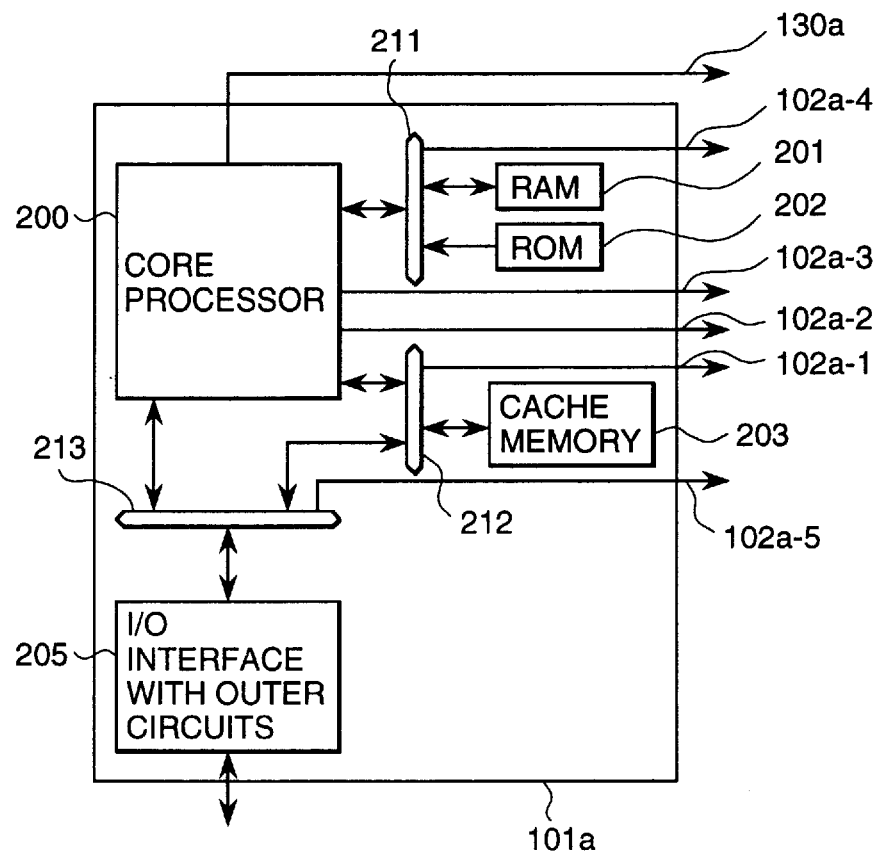

In the case of a load instruction, the IF stage is executed for reading an instruction out of the integrated ROM shown in FIG. 2. The address of the instruction to be read out is output as the internal processing result data 102a-4. In the next stage D, the read out instruction is decoded, and the contents of a source register are read out. In the stage E, the load address is calculated by the calculator of the core processor 200. The calculated load address is output as the internal processing result data 102a-3. In the stage A, the access to the integrated cache memory 203 is executed by using the load address calculated in the stage E, and the corresponding data is read out. Further, the load address is output as the internal processing result data 102a-1. Finally, in the stage W, the data read out in the stage A is written in a register of the core processor 200. Further, the data written in the register is output as the internal processing result data 102a-2.

In other instructions 1, 3 and 4, the processing of the stage IF to the stage E is the same as the processing in the load instruction. In the stage N, no processing is executed. In the stage W, the value calculated in the stage E is written in register. The calculated value written in the register is output as the internal processing result data 102a-1, similar to the processing of the load instruction.

By using the pipeline stage signal shown in part (c) of FIG. 6, which indicates whether significant processing is executed in each stage of each pipeline, as the data selection signal 130a shown in FIG. 1, it is possible to output the internal processing result data from only the internal circuit presently executing significant processing, as the internal data 131a, at every executing machine cycle (as referred to in part (d) of FIG. 6). Now, the priority of each of the bit signals 130a-1–130-4, composing the data selection data 130a, is set in the order of 130a-1, 130a-2, 130a-3, and 130a-4.

In the following, details of a second embodiment according to the present invention will be explained by referring to FIGS. 7 and 8.

A main feature of the second embodiment exists in that the number of pins of exclusive wires for inputting/outputting the internal data are decreased by transmitting the internal data via the common bus 110, in contrast to the first embodiment.

Figure 7:
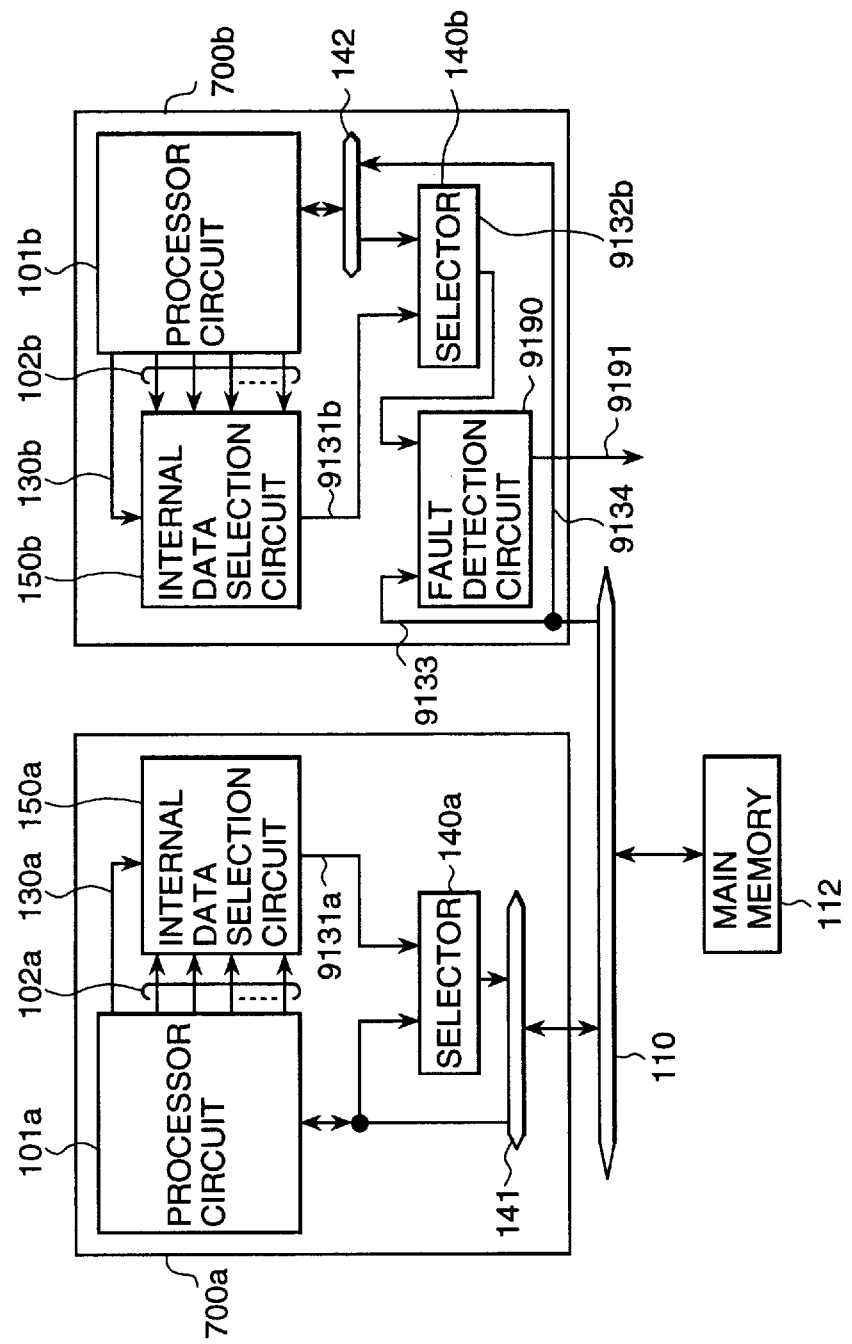
FIG. 7 is a block diagram of an information processing system forming a second embodiment according to the present invention.

An example of the an information processing system according to the second embodiment is shown in FIG. 7. In the figure, numerals 700a and 700b indicate a master unit and a checker unit, respectively. Further, numerals 9190 and 9191 indicate a fault detection circuit and a fault detecting signal, numerals 140a and 140b indicate selectors, numerals 141 and 142 indicate internal buses, numerals 9131a and 9131b indicate internal data, and numerals 9132b, 9133 and 9134 indicate transmission paths. The same numeral is used to identify a part having the same function in the first embodiment shown in FIG. 1, and explanation for each of such parts is omitted.

It is possible for each of the master unit 700a and the checker unit 700b to be composed of a respective LSI, or both the master unit 700a and the checker unit 700b may be integrated in one LSI. Further, the master unit 700a, the checker unit 700b, and the common bus 110 can be integrated in one LSI.

The master unit 700a and the checker unit 700b shown in FIG. 7 execute the same processing.

For reading data out of the main memory 112, the processor circuit 101a in the master unit 700a sends an address of the data to be read out to the main memory 112 via the selector 140a, the internal bus 141, and the common bus 110. Corresponding to the sent address, the main memory 112 sends the data stored at the address to the processor circuit 101a via the common bus 110 and the internal bus 141. The checker unit 700b also takes in the data sent to the common bus 110, in synchronism with the timing at which the data is output to the common bus 110 from the main memory 112. Further, the data is transmitted to the processor circuit 101b via the transmission path 9134 and the internal bus 142.

For writing data in the main memory 112, the processor circuit 110a in the master unit 700a sends the data and an address of the data to the main memory 112 via the selector 140 at the internal bus 141, and the common bus 110. The checker unit 700b also takes in the data sent to the common bus 110, in synchronism with the timing at which the master unit 700a outputs the data and the address to the common bus 110. The data taken in the checker unit 700b is input to the fault detection circuit 9190 via the transmission path 9133. Simultaneously, the data output from the processor circuit 101b is also input to the fault detection circuit 9190 via the internal bus 142, the selector 140b, and the transmission path 9132b.

When data is input/output between the processor circuit 101a and the main memory 112, the selector 140a selects the data from the processor circuit 101a, and outputs the data to the internal bus 141. Similarly, the selector 140b selects the data from the processor circuit 101b, and outputs the data to the fault detection circuit 9190. When data is not input/output between the processor circuit 101a and the main memory 112, the selector 140a selects the internal data 9131a output from the internal data selection circuit 150a, and outputs the data to the internal bus 141. The data output to the internal bus 141 (the internal data 9131a) is input to the fault detection circuit 9190 via the common but 110 and the transmission path 9133. Similarly, when data is not input/output between the processor circuit 101a and the main memory 112, the selector 140b selects the internal data 9131b output from the internal data selection circuit 150b, and inputs the data to the fault detection circuit 9190 via the transmission path 9132b.

Further, the fault detection circuit 9190 detects a fault occurring in the information processing system, by checking for disagreement between the data to be written in the main memory 112 by the master unit 700a and the data corresponding to the data output from the master unit 700a, which is output from the processor circuit 101b of the checker unit 700b, at the timing at which the processor circuit 101a writes the above-mentioned data in the main memory 112. When the transmission of data between the processor circuit 110a and the main memory 112 is not executed, the fault detection circuit 9190 detects a fault occurring in the information processing system, by checking for disagreement between the internal data 9131a input via the common bus 110, etc., and the internal data 9131b input via the selector 140b.

In this embodiment, the internal data 9131a is transmitted to the checker unit 700b via the common bus 110. Therefore, since pins for exclusive wires transmitting data between the master unit 700a and the checker unit 700b can be removed in the case where each of the units is composed of a respective LSI, it is possible to improve the fault detection efficiency. On the other hand, since outer wires are not used to transmit the internal data 9131a to the fault detection circuit 9190 in the case where both the master unit 700a and the checker unit 700b are integrated in one LSI chip, it is also possible to improve the fault detection efficiency.

Figure 8:
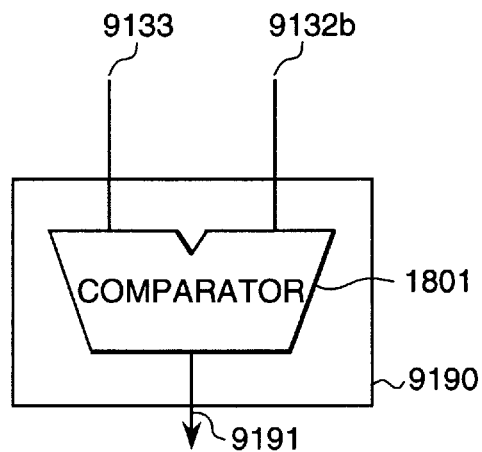
FIG. 8 is a block diagram of an example of the fault detection circuit 9190.

As shown in FIG. 8, the fault detection circuit 9190 shown in FIG. 7 can be provided in the form of a comparator 1801. The comparator 1801 compares the data input via the transmission path 9133 with the data input via the transmission path 9132b, and if disagreement between both the data is detected, the comparator outputs a fault detecting signal 9191. Although two comparators are used for the fault detection circuit 190 in the first embodiment, as shown in FIG. 5, only one comparator is used for the fault detection circuit 9190 shown in FIG. 8. Therefore, the area occupied by the fault detection circuit 9190 can be reduced in comparison with the area of the fault detection circuit 190. For example, if both the data written in the main memory by the master unit and the internal data have a 32 bit length, the area occupied by the fault detection circuit 9190 shown in FIG. 8 can be reduced to ½ of that of the fault detection circuit 190 shown in FIG. 5.

In the following, details of a third embodiment will be explained.

A main feature of the third embodiment relates to the fact that processing of the fault detection is shared by the master unit and the checker unit, in contrast to the first and second embodiments.

Figure 9:
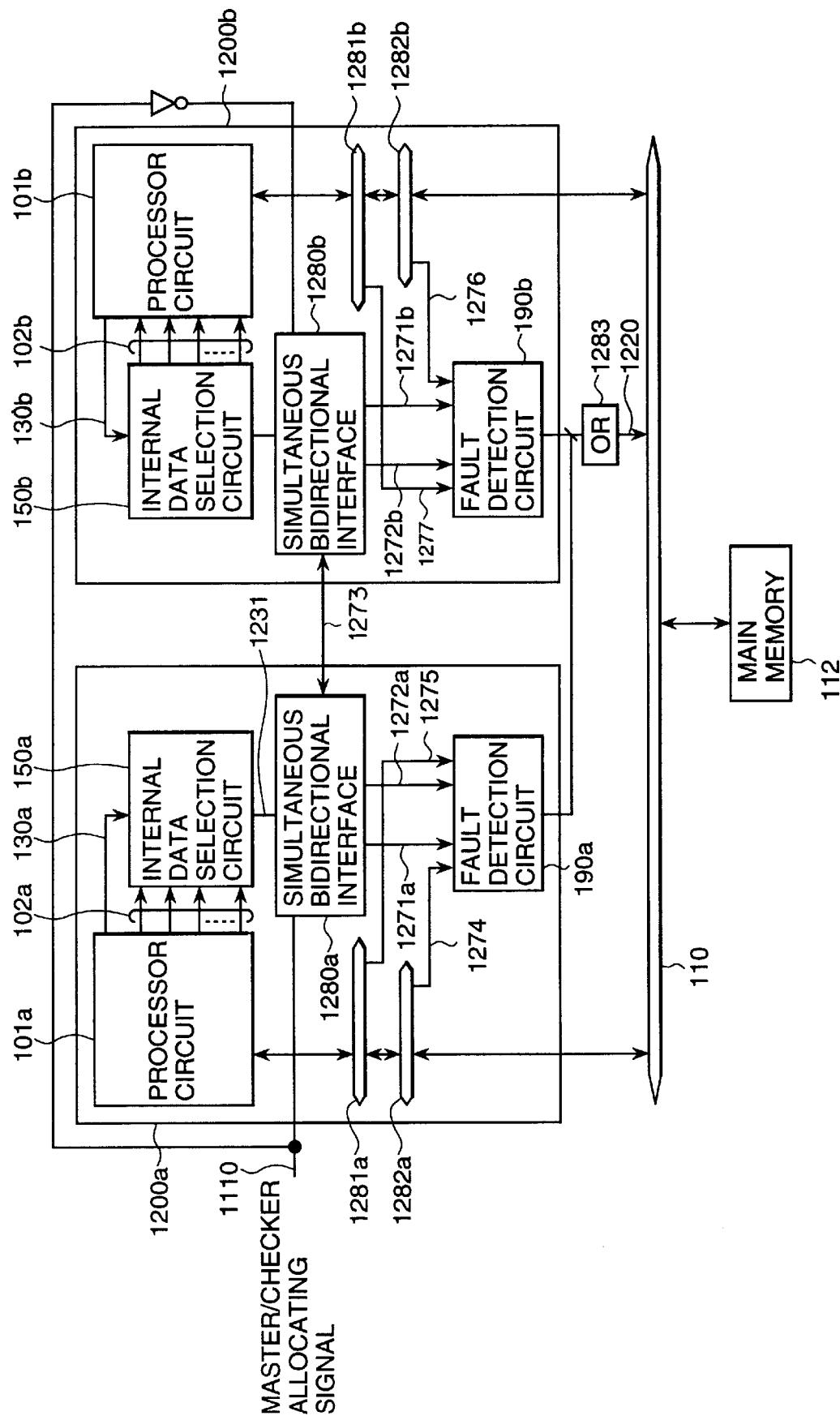
FIG. 9 is a block diagram of an information processing system forming a third embodiment according to the present invention.

An example of an information processing system according to the third embodiment is shown in FIG. 9. This information processing system comprises a master unit 1200a and a checker unit 1200b. Numeral 1110 indicates a master/checker allocating signal. In the two units, the following parts are included, that is, simultaneous bidirectional interfaces 1280a and 1280b (hereafter, a: of the master unit, b: of the checker unit), internal buses 1281a, 1281b, 1282a and 1281b, transmission paths 1271, 1272, 1273, 1275 and 1276, and an OR logic circuit 1283. The same numeral is used to identify a part having the same function in the figures showing the previous embodiments, and explanation for each of such parts is omitted.

A master unit function or a checker unit function is allocated to each of the two units shown in FIG. 9 by the master/checker allocating signal 1110 input from the outside of the system. If a value 1 is input as the master/checker allocating signal 1110, for example, a master unit function is allocated to the left unit 1200a in FIG. 9, and the master unit 1200a transmits data with the main memory 112. On the contrary, If a value 0 is input as the master/checker allocating signal 1110, a master unit function is allocated to the right unit 1200b in FIG. 9, and the unit 1200b transmits data with the main memory 112. Hereafter, it is assumed that a value 1 is input as the master/checker allocating signal 1110, that is, the unit 1200a is a master, and the unit 1200b is a checker.

It is possible for each of the master unit 1200a and the checker unit 1200b to be composed of a respective LSI, or both the master unit 1200a and the checker unit 1200b may be integrated in one LSI. Further, the master unit 12700a, the checker unit 1200b, and the common bus 110, can be integrated in one LSI.

The master unit 1200a and the checker unit 1200b execute the same processing.

For reading data out of the main memory 112, the processor circuit 110a in the master unit 1200a sends an address of the data to be read out to the main memory 112 via the internal buses 1281a and 1282a and to the common bus 110. Corresponding to the sent address, the main memory 112 sends the data stored at the address to the processor circuit 101a via the common bus 110 and to internal buses 1282a and 1281a. The checker unit 200b also takes in the data sent to the common bus 110 in synchronism with the timing at which the data is output to the common bus 110 from the main memory 112. This data is transmitted to the processor circuit 101b via the internal buses 1282b and 1281b.

For writing data in the main memory 112, the processor circuit 101a in the master unit 1200a sends the data and an address of the data to the main memory 112 via the internal buses 1281a and 1282a and the common bus 110. The checker unit 1200b also takes in the data sent to the common bus 110, in synchronism with the timing at which the master unit 1200a outputs the data and the address to the common bus 110. The data input to the checker unit 1200b is input to the fault detection circuit 190b via the internal bus 1282b and the transmission path 1276. Simultaneously, data output from the processor circuit 101b is also input to the fault detection circuit 190b via the internal bus 1281b.

In the master unit 1200a, the internal data 1231 output from the internal data selection circuit 150a is input to the simultaneous bidirectional interface 1280a. The simultaneous bidirectional interface 1280a outputs a part of the internal data 1231 to the fault detection circuit 190a via the transmission path 1271a. The rest of the internal data 1231 is output to the checker unit 1200b via the transmission path 1273.

On the other hand, the simultaneous bidirectional interface 1280b also outputs a part of the internal data output from the internal data selection circuit 150b to the fault detection circuit 190b via the transmission path 1271b. The rest of the internal data output from the internal data selection circuit 150b is output to the master unit 1200a via the transmission path 1273. The data which is transmitted from the simultaneous bidirectional interface 1280b to the master unit 1200a is data corresponding to the part of the internal data 1231 which is transmitted from the simultaneous bidirectional interface 1280a to the fault detection circuit 190a. On the other hand, the data which is transmitted from the simultaneous bidirectional interface 1280a to the master unit 1200b is data corresponding to the part of the internal data output from the internal data selection circuit 150b which is transmitted from the simultaneous bidirectional interface 1280b to the fault detection circuit 190b.

The simultaneous bidirectional interface 1280a sends the pertinent part of the internal data, which is sent from the checker unit 1200b via the transmission path 1273, to the fault detection circuit 190a via the transmission path 1272a.

Similarly, the simultaneous bidirectional interface 1280b sends the pertinent part of the internal data, which is sent from the checker unit 1200a via the transmission path 1273, to the fault detection circuit 190b via the transmission path 1272b.

As mentioned above, the fault detection circuit 190a of the master unit 1200a checks for agreement between the part of the internal data output from the internal data selection circuit 150a and the corresponding part of the internal data output from the internal data selection circuit 150b. On the other hand, the fault detection circuit 190b of the master unit 1200b checks for agreement between the remaining part of the internal data output from the internal data selection circuit 150a and the corresponding remaining part of the internal data output from the internal data selection circuit 150b. Moreover, the fault detection circuit 190b also checks for agreement between the data written in the main memory 112 from the processor circuit 101a of the master unit 1200a and the corresponding data output from the processor circuit 101b.

Further, the OR logic circuit 1283 outputs a fault detecting signal if a fault is detected in at least one of the master unit 1200a and the checker unit 1200b.

In the above-mentioned embodiment, the fault detection is executed on the basis of a comparison between the processing result data simultaneously and bidirectionally transmitted between the respective processor circuits provided in the master unit and the checker unit and is shared by the master unit and the checker unit. As mentioned above, the data transmission between the master unit and the checker unit is carried out by the simultaneous bidirectional interface provided in each of the master unit and the checker unit. Therefore, in the case where each of the master unit 1200a and the checker unit 1200b is composed of a respective LSI, the fault detection efficiency can be improved while the number of pins for wires transmitting the internal data between the master unit and the checker unit is reduced to ½ of the number of pins needed in the embodiment shown in FIG. 1. Further, in the case where both the master unit 1200a and the checker unit 1200b are integrated in one LSI chip, the fault detection efficiency is also improved while the number of wires transmitting the internal data 1231 from the master unit 1200a to the checker unit 1200b is reduced to ½ of the number of wires needed in the embodiment shown in FIG. 1.

Figure 10:
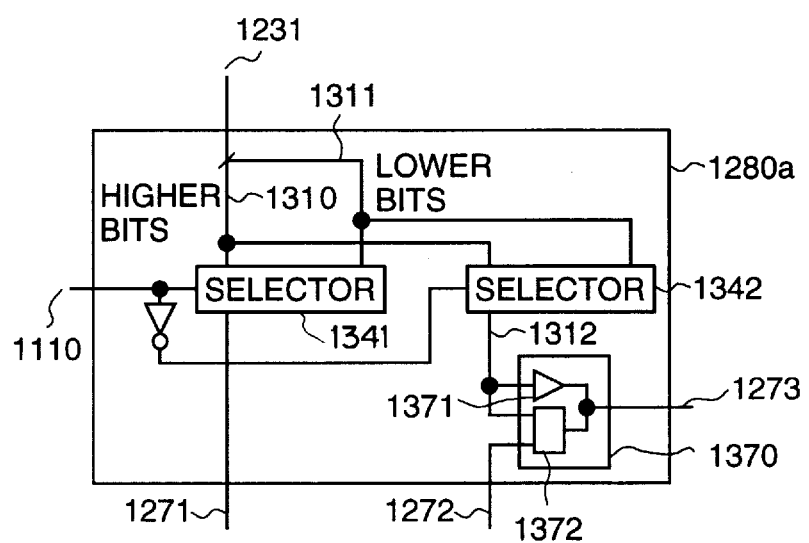
FIG. 10 is a block diagram of an example of the simultaneous bidirectional interface 1280.

Details of the simultaneous bidirectional interface 1280a will be explained in the following, by referring to FIG. 10. As shown in FIG. 10, the simultaneous bidirectional interface 1280a is composed of selectors 1341 and 1342, a simultaneous bidirectional I/O circuit 1370, including an output buffer 1371 and an input circuit 1372, and transmission paths 1310–1312.

For example, it is assumed here that the internal data 1231 has a 32 bit width. The upper 16 bits of the internal data are transmitted to the selectors 1341 and 1342 via the transmission path 1310, and the lower 16 bits of the internal data are also transmitted to the selectors 1341 and 1342 via the transmission path 1311. That is, the internal data 1231 is divided into two parts including upper 16 bit data and lower 16 bit data, and both of the 16 bit data are input to the selectors 1341 and 1342, respectively. Further, if one of the selectors selects and outputs the upper 16 bit data, the other one selects and outputs the lower 16 bit data. That is, in the simultaneous bidirectional interface 1280a of the master unit, if the selector 1341 selects and outputs the upper 16 bit data, the selector 1342 selects and outputs the lower 16 bit data. On the other hand, in the simultaneous bidirectional interface 1280 of the checker unit, the manner of data selection in the selectors 1341 and 1342 is inverse to the manner of data selection in the simultaneous bidirectional interface 1280a of the master unit. That is, in the simultaneous bidirectional interface 1280b, if the selector 1341 selects and outputs the lower 16 bit data, the selector 1342 selects and outputs the upper 16 bit data.

The simultaneous bidirectional I/O circuit 1370 is provided to use the transmission path 1312 as a path for simultaneously and bidirectionally transmitting data between the master unit and the checker unit, and transmits data output from the selector 1342 to the other unit via the output buffer 1371 and the transmission path 1273. At the same time, the simultaneous bidirectional I/O circuit 1370 detects the signal level of the data transmitted from the other unit via the transmission path 1373, and sends the detected signal level to the fault detection circuits 190a and 190b. The signal level detection is accomplished by comparing the signal level of the data on the transmission path 1273 with the signal level of the data transmitted via the transmission path 1312, in the input circuit 1372. For example, it is assumed that the output buffer 1371 outputs signals of the level 0 or V. Under this assumption, if the signal level of the data input from the transmission path 1312 is V and the signal level of the data on the transmission path 1273 is V/2, it is determined that the signal level of the data output from the checker unit is 0. If the signal level of the data input from the transmission path 1312 is V and the signal level of the data on the transmission path 1273 is also V, it is determined that the signal level of the data output from the checker unit is V. Further, if the signal level of the data input from the transmission path 1312 is 0 and the signal level of the data on the transmission path 1273 is also 0, it is determined that the signal level of the data output from the checker unit is 0. Furthermore, if the signal level of the data input from the transmission path 1312 is 0 and the signal level of the data on the transmission path 1273 is V/2, it is determined that the signal level of the data output from the checker unit is V.

In this example, the lower 16 bit data is transmitted to the checker unit from the master unit, and the upper 16 bit data is transmitted to the master unit from the checker unit. Further, the simultaneous bidirectional I/O interface 1370 outputs the above-mentioned detected signal level to the transmission path 1272.

Now, the data output from each selector 1341 of the respective simultaneous bidirectional interfaces 1280a and 1280b of the master unit and the checker unit are sent to the fault detection circuits 190a and 190b via the transmission paths 1271a and 1271b, respectively. In the example, the selector 1341 of the simultaneous bidirectional interface 1280a in the master unit outputs the upper 16 bits of the internal data, and the selector 1341 of the simultaneous bidirectional interface 1280b in the checker unit outputs the lower 16 bits of the internal data.

Thus, the upper 16 bits of the internal data processed in the master unit and the upper 16 bits of the internal data processed in the checker unit are input to the fault detection circuit 190a of the master unit. On the other hand, the lower 16 bits of the internal data processed in the master unit and the lower 16 bits of the internal data processed in the checker unit are input to the fault detection circuit 190b of the checker unit. As mentioned above, in this embodiment, the fault detection of the internal data is shared by the master unit and the checker unit.

Although the internal data is divided into upper bit data and lower bit data in the explanation of this embodiment, the manner of division of the internal data need not be restricted to the above manner. That is, it is possible to divide the internal data into even bit data and odd bit data.

Further, although a simultaneous bidirectional I/O circuit is used, it is possible to use pins or wires in common without using a simultaneous bidirectional I/O circuit by composing the master unit and the checker unit so that each of the units alternatively transmits the data to be compared.

In the following, a fourth embodiment according to the present invention will be explained in detail, by referring to FIGS. 11, 12 and 13.

A main feature of the fourth embodiment relates to the fact that not only the internal processing result data, but also the data selection signal, are transmitted together as internal data between the master unit and the checker unit, in contrast to the above-explained embodiments. Further, the data selection signal is included in the fault detecting signal 15191.

Figure 11:
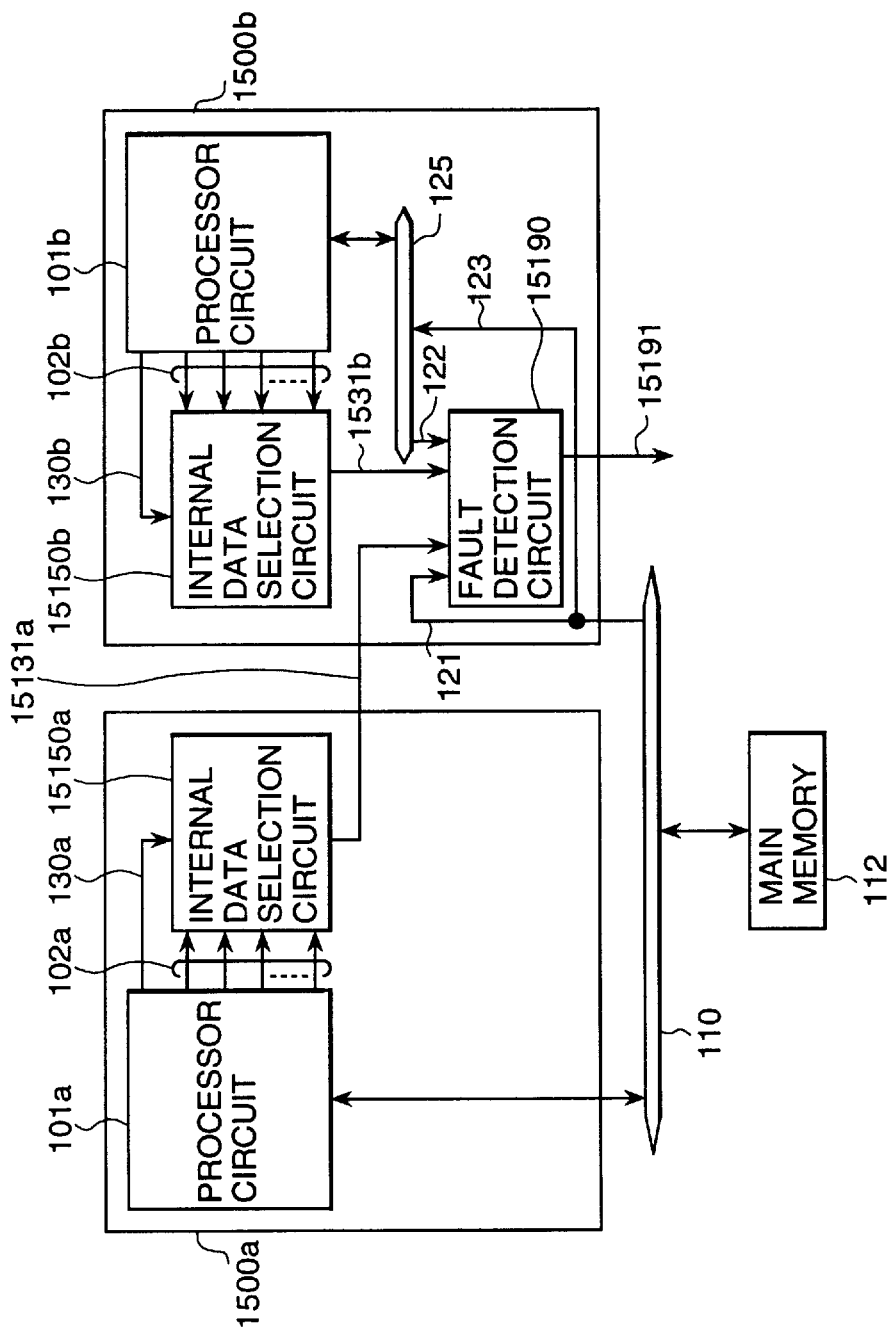
FIG. 11 is a block diagram of an information processing system forming a fourth embodiment according to the present invention.

In FIG. 11, numerals 1500a and 1500b indicate a master unit and a checker unit, respectively. Further, numerals 15150a and 15150b indicate internal data selection circuits, numerals 15131a and 1513b indicate internal data, and numerals 15190 and 15191 indicate a fault detection circuit and a fault detecting signal, respectively. A part having the same function as that of a part in the above-explained embodiments is identified with the same numeral, and explanation for it is omitted. Further, it is possible for each of the master unit 1500a and the checker unit 1500b to be composed of a respective LSI, or both the master unit 1500a and the checker unit 1500b may be integrated in one LSI. Further, the master unit 1500a, the checker unit 1500b, and the common bus 110, can be integrated in one LSI.

The internal data selection circuit 15150a of the master unit 1500a selects one of the internal processing result data 102a on the basis of the data selection signal 130a, and outputs the selected data together with the data selection signal 130a, as the internal data 15131a. The internal data 15131a is input to the fault detection circuit 15190 of the checker unit 1500b.

The internal data selection circuit 15150b of the checker unit 1500b also selects one of the internal processing result data 102b on the basis of the data selection signal 130b, and outputs the selected data together with the data selection signal 130b to the fault detection circuit 15190, as the internal data 15131b.

The fault detection circuit 15190 monitors the agreement between the internal data 15131a and 15131b by comparing both internal data. Moreover, the fault detection circuit 15190 also monitors the agreement between the data input via the transmission path 121 and the data input via the transmission path 122 by comparing both input data. If a disagreement is detected in at least one of the two kinds of input pair data, the fault detection circuit 15190 outputs a fault detecting signal 15191 including the data selection signal 130a or 130b.

As mentioned above, by including the data selection signal in the fault detecting signal 15191, not only a fault occurrence, but also a place of the fault occurrence, can be detected. Consequently, since the counter-measures corresponding to the place of the fault occurrence can be more easily taken, the reliability of the information processing system is further improved.

Figure 12:
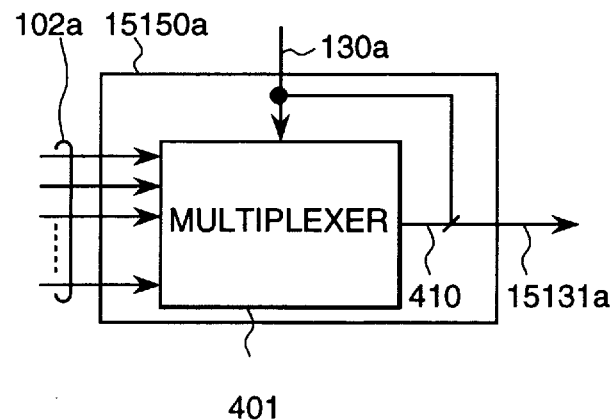
Figure 13:
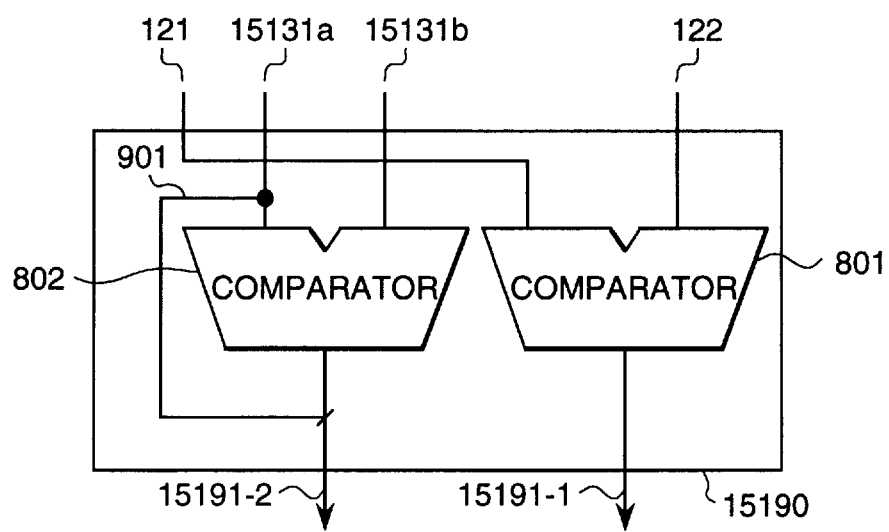
FIG. 13 is a block diagram of an example of the fault detection circuit 15190.

A detailed example of the internal data selection circuit 15150a of FIG. 11 is shown in FIG. 12. A multiplexer 401 selects and outputs one of the internal processing result data 102a as the output data 410, based on the data selection signal 130a. The output data 410 and the data selection signal data 130a are combined and output as the internal data 15131a.

In the following, an example of the fault detection circuit 15190 will be explained, by referring to FIG. 13. In the figure, numerals 15191-1 and 15191-2 indicate fault detection signals, and numeral 901 indicates a transmission path. A comparator 801 compares the data input via the transmission path 121 and the data input via the transmission path 122, and if a disagreement between both input data is detected, the comparator 801 outputs a fault detecting signal 15191-1. On the other hand, a comparator 802 compares the internal data 15131a and the internal data 15131b, and if a disagreement between both input data is detected, the comparator 802 outputs a fault detecting signal 15191-2. The fault detecting signal 15191-2 includes the data selection signal data which is taken out of the internal data 15131a and transmitted via the transmission path 901.

Figure 14:
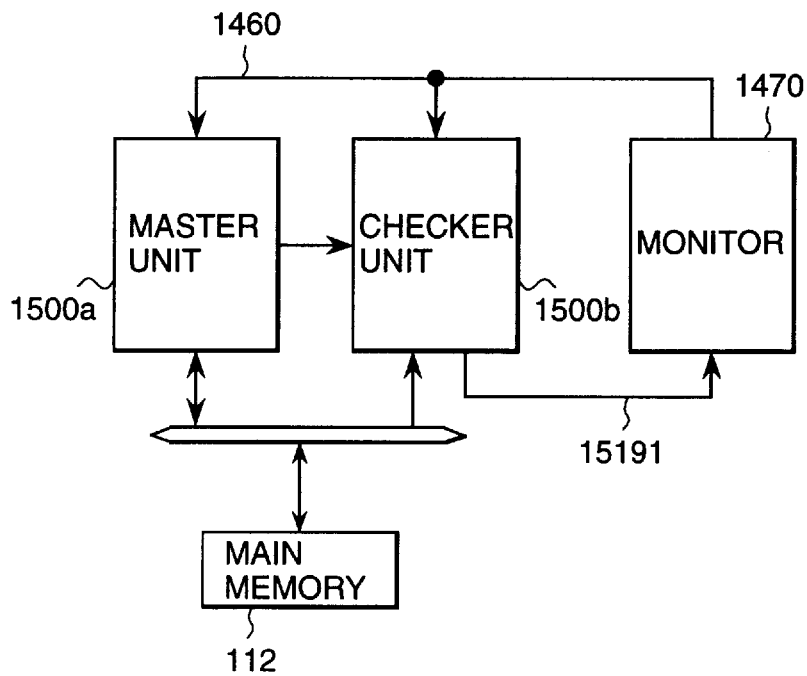
FIG. 14 is a block diagram of an information processing system according to the present invention.

An information processing system, in which the units in the above-explained embodiments are utilized, will be explained by referring to FIG. 14.

In the figure, numerals 1470 and 1460 indicate a monitor and a control signal, respectively. As a master unit and a checker unit, for example, the units shown in FIG. 11 are utilized.

The fault detecting signal 15191 output from the checker unit 1500b is input to the monitor 1470. The monitor 1470 can determine in which internal circuit a fault is occurring, based on the data selection signal included in the fault detecting signal 15191. Therefore, by appropriately supplying the control signal 1460 to each of the master unit 1500a and the checker unit 1500b, it is possible to adopt an optimal counter-measure corresponding to the contents of the detected fault. For example, if it is determined that a fault is occurring in a calculator, it is possible to avoid influences of the fault by again executing the calculation processing at the time when the fault has occurred, and it is also possible to prevent a system shutdown if the fault is a minor one. Further, a system shutdown also can be prevented by executing only the processing which does not use the internal circuit in which the fault is occurring. As mentioned above, according to this embodiment, since the optimal countermeasure corresponding to the contents of the detected fault can be taken, the reliability is further improved.

Another information processing system in which the units in the above-explained embodiments are utilized, will be explained by referring to FIG. 15.

In the figure, numeral 1600a indicates a primary processing node presently executing information processing, and numeral 1600b indicates a stand-by processing node standing by without performing any information processing. Further, numerals 1591a and 1591b indicate fault detecting signals, and numeral 1560 indicates a control signal.

Each of the primary processing node 1600a and the stand-by processing node 1600b can be composed of a respective LSI, or both the primary processing node 1600a and the stand-by processing node 1600b can be integrated in one LSI. In FIG. 15, the master unit and the checker unit respectively integrated in the primary processing node 1600a and the stand-by processing node 1600b, have the same functions as the respective functions of the master unit 1500a and the checker unit 1500b shown in FIG. 14.

Figure 15:
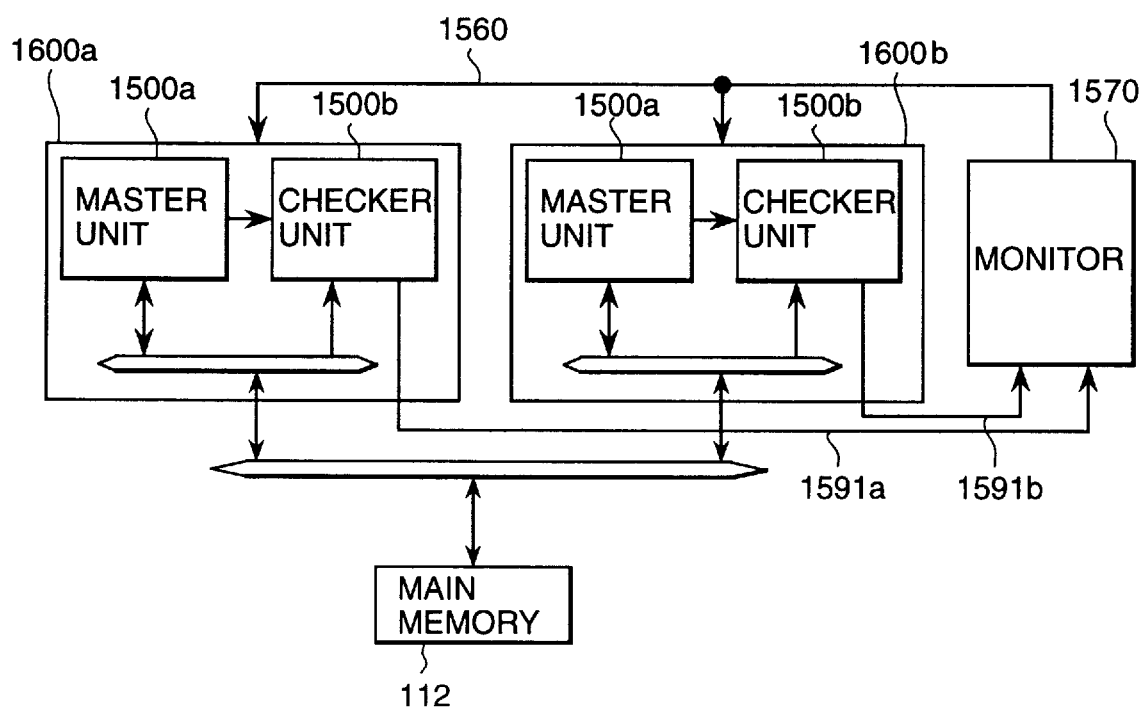
FIG. 15 is a block diagram of an information processing system according to the present invention.

In FIG. 15, if a fault is detected in the primary processing node 1600a, a fault detecting signal 1591a is output to the monitor 1570. The monitor 1570 can determine in which of the internal circuits the fault has occurred, based on the fault detecting signal 1591a. Therefore, the monitor 1570 can control the information processing apparatus composed of the primary processing node 1600a and the stand-by processing node 1600b so that the processing presently executed by the primary processing node 1600a is passed to the stand-by processing node 1600b. For example, it is assumed that a fault is occurring in the cache memory of the master unit in the primary processing node 1600a. Upon occurrence of such a fault, during the execution of processing without using the cache memory, influences of the fault do not propagate to the outside of the primary processing node 1600a. Therefore, at the time of detecting the fault, the monitor 1570 switches the processing mode of the primary processing node 1600a to a degenerate processing mode in which the cache memory is not used. Further, the monitor 1570 sends a control command 1560 such that the stand-by processing node 1600b starts preparatory operations for itself to start operation. If the preparatory operations of the stand-by processing node 1600b are finished before influence of the fault propagates from the primary processing node 1600a to the outside, the processing to be executed by the primary processing node 1600a can be passed to the stand-by processing node 1600b without interrupting the processing. By employing the features of this embodiment, the reliability of the information processing system is further considerably improved.

In the following, another example of the processor circuit 101a according to the first embodiment shown in FIG. 1 will be explained, by referring to FIG. 16.

In the figure, numerals 1610 and 1611 indicate a mask register and masking data, respectively, and numerals 1620 and 1630 indicate a pipeline stage signal and an AND logic circuit, respectively.

Figure 16:
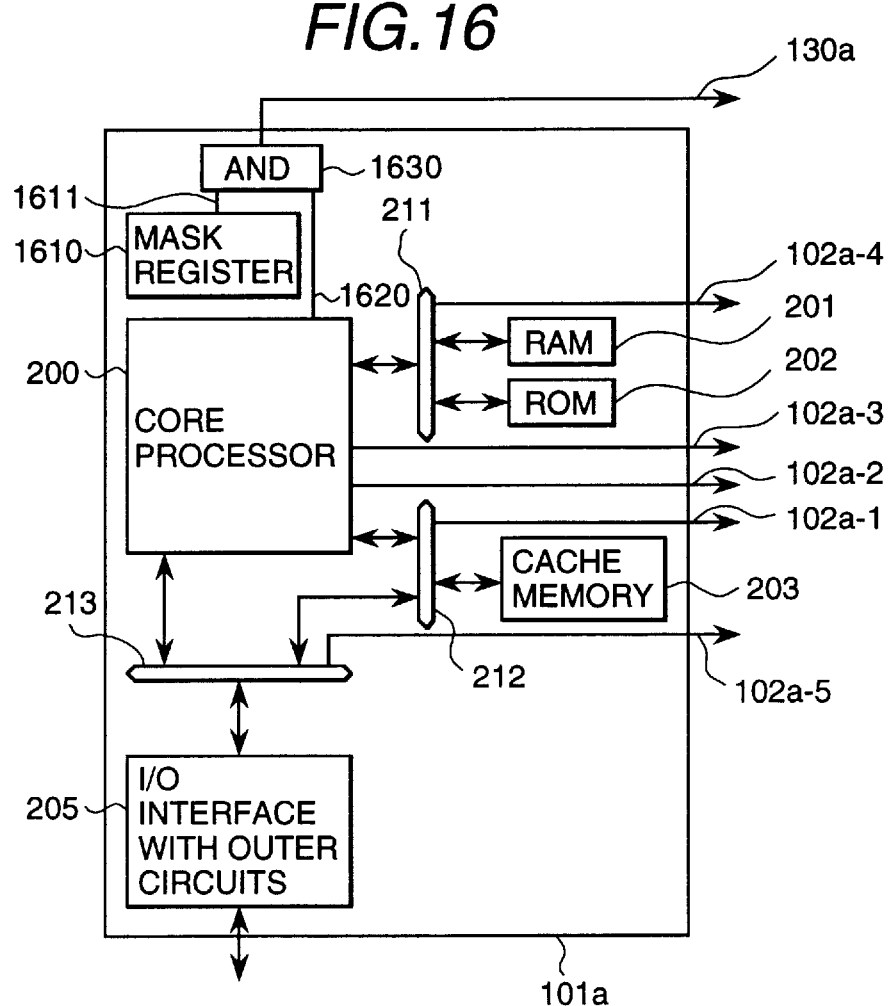
FIG. 16 is a block diagram of another example of a processor circuit, which is different from the composition of the processor circuit 101a shown in FIG. 1.

A main feature of the processor circuit 101a shown in FIG. 16 relates to the fact that an AND operation of both the pipeline stage signal and masking data is carried out, and a result of the AND operation is output as the data selection signal 130a.

The mask register 1610 is a register which stores the states of use of each of the internal peripheral circuits integrated in the processor circuit 101a. For example, if the processor circuit 101a operates in the processing mode wherein the processor does not use the integrated cache memory 203, but uses the RAM 201, a value 0 is stored, in a location in the mask register 1610 assigned to the integrated cache memory 203, and a value 1 is stored in a location in the mask register 1610 assigned to the integrated RAM 201.

The pipeline stage signal 1620 is a signal for indicating whether significant processing is executed in each of the pipeline stages. The core processor 200 outputs the pipeline stage signal 1620, corresponding to its processing state.

The AND logic circuit 1630 executes an AND operation on both the pipeline stage signal 1620 and the masking signal 1611 output from the mask register 1610.

There is a case wherein high reliability is required in an information processing system, and so an integrated cache memory is not used in such system in order to prevent the occurrence of a disagreement between data stored in a main memory and the corresponding data stored in an integrated cache memory, which may be caused by disturbances, such as noise. Since it is predetermined in such a case that the integrated cache memory will not be used, and the fault detection for the integrated cache memory becomes unnecessary, the fault detection efficiency decreases for the above-mentioned case. In comparison with the above-mentioned system, by using the embodiment of the present invention shown in FIG. 16, since the internal peripheral circuits to be checked for a fault occurrence can be flexibly set, corresponding to an application program to be processed, or the environment in which the information processing system is used, the fault detection efficiency can be improved for any combination of the internal peripheral circuits to be used.

Figure 17:
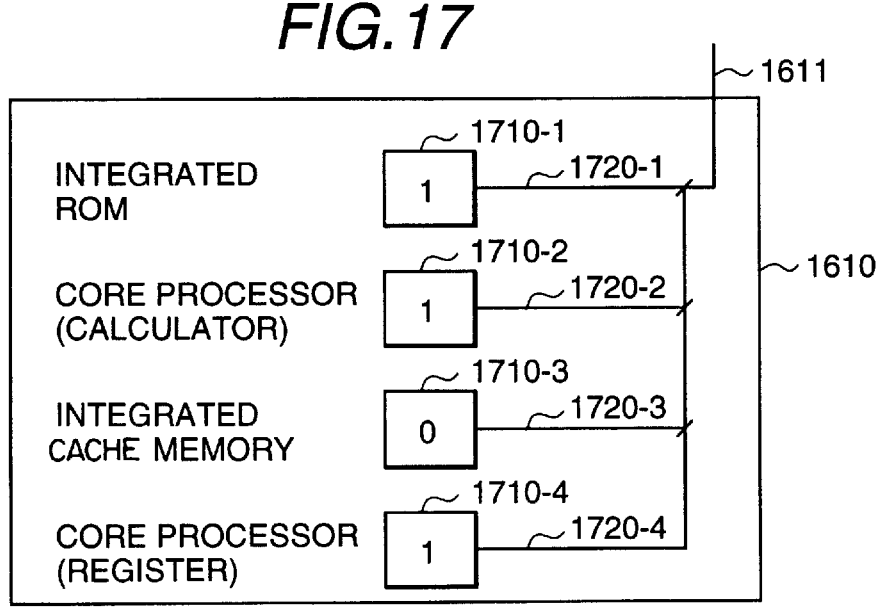
FIG. 17 is a diagram of an example of the mask register 1610.

In the following, an example of the mask register 1610 shown in FIG. 16 will be explained, by referring to FIG. 17. In the figure, numerals 1710-1–1710-4 indicate registers, and numerals 1720-1–1720-4 indicate masking data.

In this example, the registers 1710-1–1710-4 are assigned to the integrated ROM 201, the calculator in the core processor 200, the integrated cache memory 203, and the register in the core processor, shown in FIG. 16, respectively. In the case shown in FIG. 17, since data stored in the register 1710-3 has a value 0, the fault detection is not performed for the integrated cache memory corresponding to the register 1710-3.

Operations of the processor circuit 101a having the composition shown in FIG. 16 will be explained by using the time chart shown in FIG. 18.

Figure 18:
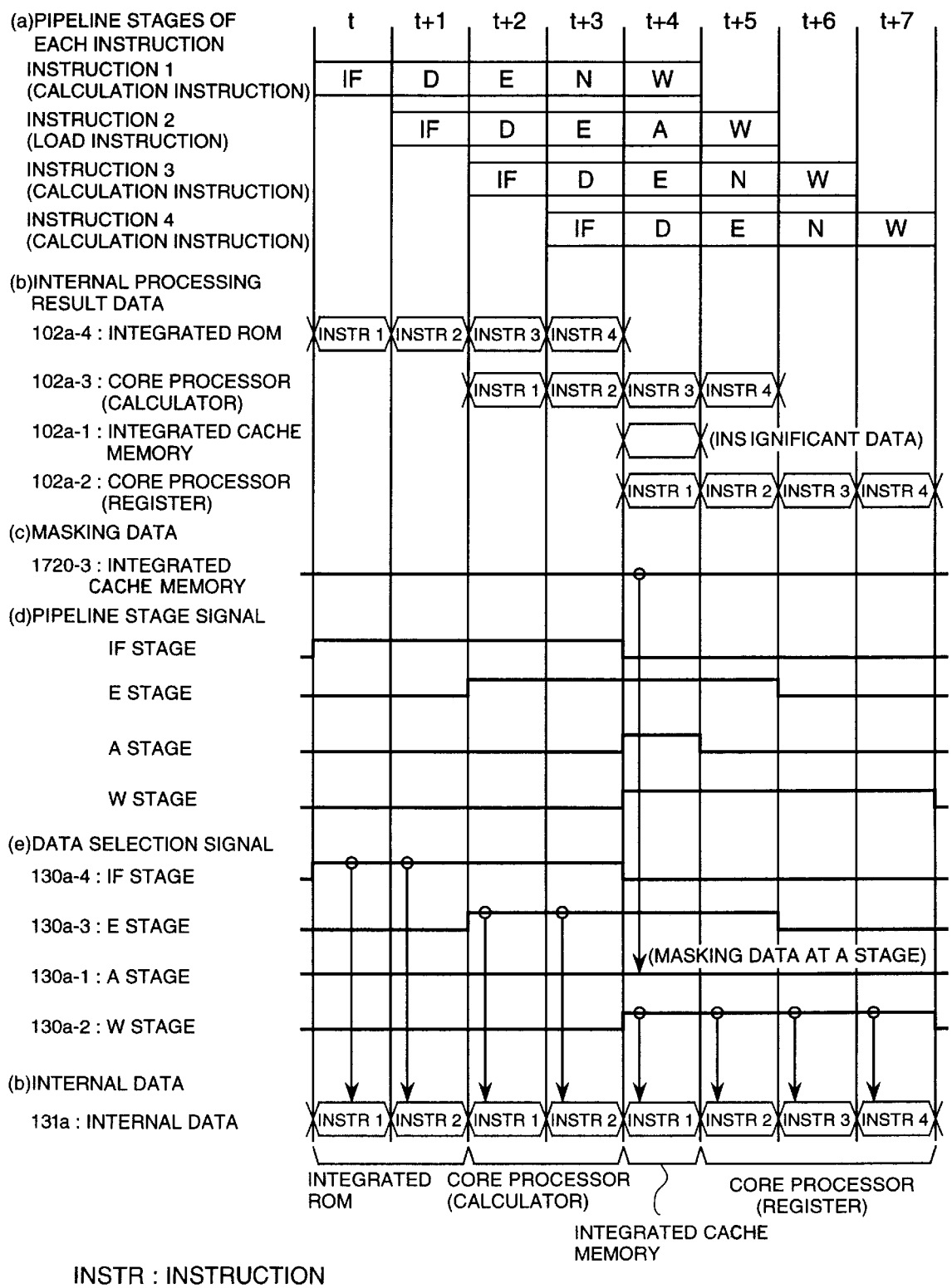
FIG. 18 is a time chart for explaining operations of a processor circuit in which the composition shown in FIG. 16 is adopted.

The time chart shown in FIG. 18 indicates operations of information processing executed by the processor circuit 101a without using the integrated cache memory 203, for the same instruction series as shown in FIG. 6.

Since contents shown in part (a) of FIG. 18 are the same as the contents shown in part (a) of FIG. 6, an explanation of part (a) of FIG. 18 is omitted.

A part (b) of FIG. 18 shows what contents of the internal processing result data 102a are output from the processor circuit 101a, while the instructions are executed, similar to the part (b) of FIG. 6. In this example, since the processor circuit 101a operates in the mode of processing data without using the integrated cache memory 203, insignificant data is output as the internal processing result data 102a-1 at the cycle (t+4).

In a part (c) of FIG. 18, a value of the masking data 1720-3 corresponding to the integrated cache memory 203 is shown. In this case, the value of the masking data 1720-3 is 0. All the other masking data 1270-1, 1270-2 and 1270-4, not shown in the figure, have a value 1.

A part (d) of FIG. 18 shows changes of the pipeline stage signals 1620 output from the core processor 200. The change in the data output as the internal data 131a are the same as the changes shown in FIG. 6 for the interval t to (t+3), and the interval (t+5) to (t+7). Data output as the internal data 131a at the cycle (t+4) is not the internal processing result data 102a-1 corresponding to the integrated cache memory, but is the internal processing result data 102a-2 corresponding to the register in the core processor 200. This is because the data selection signal 130a-1 is invalidated (that is, the level of the signal is set as 0) by masking a signal corresponding to the integrated cache memory (namely, a signal indicating the A stage), of the pipeline stage signals 1620, with the masking data 1720-3. Thus, a very efficient fault detection can be realized by outputting the internal processing result data 102a-2 in the place of the internal processing result data 102a-1, even if insignificant pipeline stages exist.

In all of the above-explained embodiments, it is possible to improve the fault detection efficiency without increasing the number of pins, the number of wires, or the area occupied by the fault detection circuit.

Although the fault detection circuit is provided in the checker unit in all the above-mentioned embodiments, the fault detection circuit can be independently provided outside of the master unit and the checker unit. Moreover, if all the necessary elements which make up each of the above-mentioned embodiments are included in an information processing system, the configuration of the system need not be restricted to the configurations of the above-explained embodiments.

In the claims which define the present invention, "internal circuit" is supported by, for example, the RAM 201, the ROM 202 and the cache memory 203, shown in FIG. 1. "Internal processing result outputting means" is supported by, for example, the buses 211 and 212, and the wire for transmitting the internal processing result data 102 from the processor circuit 101a to the internal data selection circuit 150a, shown in FIG. 2. "Comparator" is supported by, for example, the comparator 802 provided in the fault detection circuit 190 shown in FIG. 1. "Bus" is supported by, for example, the bus 110 shown in FIG. 1. "The first selector" is supported by the selector 140a shown in FIG. 7. "The second selector" is supported by the selector 140b shown in FIG. 7. "Transmission path" is supported by, for example, the transmission path 1273 shown in FIG. 9. "Internal data outputting means" is supported by, for example, the simultaneous bidirectional interface 1280a shown in FIG. 9. "Processing node" is supported by, for example, the primary processing node 1600a and the stand-by processing node 1600b shown in FIG. 15. "Fault detection means" is supported by, for example, the fault detection circuit 15190 provided in each checker unit of the primary processing node 1600a and the stand-by processing node 1600b shown in FIG. 11. "Switching means" is supported by, for example, the monitor 1570 shown in FIG. 15. "Processing state outputting means" is supported by, for example, the mask register 1610 and the AND logic circuit 1630.

As mentioned above, according to the present invention, in the case of composing each of the master unit and the checker unit as a respective LSI, the fault detection efficiency can be improved, while avoiding an increase in the number of wiring pins between LSIs and in the area occupied by the fault detection circuit is suppressed. Further, in the case of integrating both the master unit and the checker unit into one LSI, the fault detection efficiency also can be improved, while avoiding an increase in the number of wires for transmitting the internal data to the fault detection circuit and in the area occupied by the fault detection circuit.

What is claimed is:

1. Information processing system, including a plurality of information processing units, wherein a fault occurring in said plurality of information processing units is detected by carrying out a comparison among data being processed and output by each of said plurality of information processing units, wherein each of said plurality of information processing units includes a processor circuit in which a plurality of internal circuits are integrated, an internal processing result outputting means for outputting respective result data processed by respective ones of said plurality of internal circuits, and an internal data selection circuit for selecting and outputting a selected result data, output from said internal processing result outputting means, at a predetermined timing, and wherein said information processing system further includes a comparator for executing a comparison among result data, selected and output from said internal data selection circuit in each information processing unit, and for outputting a result of said comparison.

2. Information processing system according to claim 1, further including at least one bus connecting said information processing units and providing a connection between said comparator and at least one of said information processing units, said at least one of said information processing units supplying data, output from the internal data selection circuit provided therein, to said comparator via said at least one bus.

3. Information processing system according to claim 2, wherein said information processing unit, which supplies data output from said internal data selection circuit provided therein to said comparator via said at least one bus, further includes a first selector for selecting either data output from said processor circuit provided in said at least one information processing unit or data output from said internal data selection circuit provided in said at least one information processing unit.

4. Information processing system according to claim 2, further including a memory device, wherein data output from the processor circuit of said at least one information processing unit to said memory device via said at least one bus and is also input to said comparator and compared with data output from the processor circuit of another one of said information processing units and input to said comparator.

5. Information processing system according to claim 3, wherein said comparator is included in another one of said information processing units, and said another information processing unit including said comparator further includes a second selector for selecting and outputting either data output from said processor circuit provided in said another information processing unit or data output from said internal data selection circuit provided in said another information processing unit in synchronism with a data selection of said first selector provided in said at least one information processing.

6. Information processing system, including a plurality of information processing units, wherein a fault occurring in said plurality of information processing units is detected by carrying out a comparison among data being processed and output by each of said plurality of information processing units, said information processing system comprising:

a bidirectional data transmission path for bidirectionally transmitting data between said information processing units;

wherein each of said plurality of information processing units includes a processor circuit in which a plurality of internal circuits are integrated, an internal processing result outputting means for outputting each result data, processed by respective ones of said plurality of internal circuits, an internal data selection circuit for selecting and outputting a selected result data, output from said internal processing result outputting means, at a predetermined timing, an internal data outputting means for outputting one part of data output from said internal data selection circuit to another one of said information processing units via said bidirectional data transmission path, and a comparator for executing a comparison between the remaining part of data output from said internal data selection circuit and a corresponding part of data output from the internal data outputting means of said another one of said information processing units, and for outputting a result of the comparison.

7. Information processing system according to claim 6, wherein said internal data outputting means in each of said information processing units comprises a simultaneous bidirectional interface for simultaneously and bidirectionally transmitting data between said information processing units via said bidirectional data transmission path.

8. Information processing system according to one of claims 1–7, wherein said internal data selection circuit further outputs data selection information for indicating which of data output from said internal processing result outputting means has been selected, and said comparator outputs a result of said comparison together with said data selection information.

9. Information processing system according to claim 8, further including recovery processing means for carrying out a counter-measure to a detected fault, corresponding to contents of both said result of said comparison and said data selection information.

10. Information processing system according to claim 9, wherein each of said processor circuits includes processing state outputting means for outputting data concerning the processing states of each of said internal circuits, and said internal data selection circuit includes means for changing result data to be selected in response to data output from said processing state outputting means.

11. Information processing system according to claim 8, wherein each of said processor circuits includes processing state outputting means for outputting data concerning the processing states of each of said internal circuits, and said internal data selection circuit includes means for changing the result data to be selected in response to said data output from said processing state outputting means.

12. Information processing system according to one of claims 1–7, wherein each of said processor circuits includes processing state outputting means for outputting data concerning the processing states of each of said internal circuits, and said internal data selection circuit includes means for changing result data to be selected in response to data output from said processing state outputting means.

13. Information processing system including a plurality of processing nodes, wherein information processing which results in a fault is continued by switching from a processing node executing the information processing to another processing node, corresponding to the processing states of said information processing system, wherein each of said processing nodes includes a fault detection means for monitoring processing states of said node and for outputting information of a fault occurrence and a fault occurrence location if a fault is detected, and a switching means for switching the processing node executing the information processing at the time of fault detection to other processing node, by subjecting said fault occurrence location to a predetermined counter-measure.

14. Information processing system according to claim 13, wherein each of said processing nodes comprises a plurality of processor circuits, each of said processor circuits including a plurality of internal circuits and an internal processing result outputting means for outputting respective result data processed by respective ones of said internal circuits, an internal data selection circuit which is connected to said internal circuits of the processor circuit via the processing result outputting means, for selecting and outputting one of said result data output from said internal processing result outputting means, at a predetermined timing, and said fault detection means including means for effecting a comparison among result data selected by said internal data selection circuits provided in said node and for outputting a result of said comparison together with data selection information for indicating which of data output from said internal processing result outputting means has been selected.

15. Logic LSI comprising:

a processor circuit including a plurality of internal circuits and internal processing result outputting means for outputting respective result data processed by respective ones of said internal circuits; and an internal data selection circuit for selecting one of said result data output from said internal processing result outputting means.

16. Logic LSI according to claim 15, further including a comparator for executing a comparison between data input from outside of said logic LSI and data output from said internal data selection circuit provided in said LSI.

17. Logic LSI according to claim 16, further including a bidirectional I/O circuit for simultaneously and bidirectionally transmitting data using the same transmission line, wherein a part of data output from said internal data selection circuit is output to the outside of said LSI via said simultaneous bidirectional I/O circuit, and said data input from the outside of said LSI is taken in via said bidirectional I/O circuit.

18. Logic LSI according to any one of claim 15, 16 or 17, further including processing state outputting means for outputting data concerning the processing states of each of said internal circuits, wherein said internal data selection circuit includes means for changing the result data to be selected in response to data output from said processing state outputting means.

* * * * *